United States Patent
Douglass et al.

(10) Patent No.: US 11,520,042 B1
(45) Date of Patent: Dec. 6, 2022

(54) APPARATUS AND METHODS FOR ARTIFICIAL INTELLIGENCE BATHYMETRY

(71) Applicant: Mythos AI Inc, West Palm Beach, FL (US)

(72) Inventors: Geoffrey Michael Douglass, West Palm Beach, FL (US); John Rogers Houston, Weston, MA (US); Allen Edward Flick, Pittsburgh, PA (US); Damon Allen Wolfe, Hartwell, GA (US)

(73) Assignee: Mythos AI Inc, West Palm Beach, FL (US)

( * ) Notice: Subject to any disclaimer, the term of this patent is extended or adjusted under 35 U.S.C. 154(b) by 0 days.

(21) Appl. No.: 17/669,671

(22) Filed: Feb. 11, 2022

(51) Int. Cl.
| | |
|---|---|
| *G01S 15/89* | (2006.01) |
| *G05D 1/02* | (2020.01) |
| *G01S 7/52* | (2006.01) |
| *B63B 79/40* | (2020.01) |
| *G01C 13/00* | (2006.01) |

(52) U.S. Cl.
CPC ......... *G01S 15/8902* (2013.01); *B63B 79/40* (2020.01); *G01C 13/00* (2013.01); *G01S 7/52003* (2013.01); *G05D 1/0206* (2013.01); *B63B 2211/02* (2013.01)

(58) Field of Classification Search
CPC . G01S 15/8902; G01S 7/52003; B63B 79/40; G01C 13/00; G05D 1/0206; G63B 2211/02
See application file for complete search history.

(56) References Cited

U.S. PATENT DOCUMENTS

| | | | |
|---|---|---|---|
| 5,689,475 | A | 11/1997 | Chaumet-Lagrange |
| 6,130,641 | A | 10/2000 | Kraeutner et al. |
| 7,355,924 | B2 | 4/2008 | Zimmerman et al. |
| 9,103,937 | B2 | 8/2015 | Rikoski |
| 10,247,826 | B2 | 4/2019 | Shiraki |
| 10,331,025 | B2 | 6/2019 | Sinha et al. |
| 10,502,828 | B2 * | 12/2019 | Kronander ............. G01S 7/006 |
| 10,809,376 | B2 | 10/2020 | Chan et al. |
| 11,016,185 | B1 | 5/2021 | Rikoski |

(Continued)

FOREIGN PATENT DOCUMENTS

| | | |
|---|---|---|
| IN | 202141018722 A | 4/2021 |
| WO | 2019239321 | 12/2019 |

*Primary Examiner* — Ian J Lobo
(74) *Attorney, Agent, or Firm* — Caldwell Intellectual Property Law

(57) ABSTRACT

An apparatus for artificial intelligence (AI) bathymetry is disclosed. The apparatus includes a sonic unit attached to a boat, the sonic unit configured to generate a plurality of metric data as a function of a plurality of ultrasonic pulses and a plurality of return pulses. An image processing module is configured to generate a bathymetric image as a function of the plurality of metric data, identify, as a function of the bathymetric image, an underwater landmark, and register the bathymetric image to a map location as a function of the underwater landmark. A communication module is configured to transmit the registered bathymetric image to at least a remote device. An autonomous navigation module is configured to determine a heading for the boat as a function of a path datum and command boat control to navigate the boat as a function of the heading.

20 Claims, 10 Drawing Sheets

(56) References Cited

U.S. PATENT DOCUMENTS

| | | |
|---|---|---|
| 11,072,405 B2 * | 7/2021 | Larson .................. G01S 7/4815 |
| 11,280,896 B2 * | 3/2022 | Hawker ............... G05D 1/0206 |
| 2015/0078123 A1 * | 3/2015 | Batcheller ............... G01S 15/86 |
| | | 367/7 |
| 2017/0363724 A1 | 12/2017 | Reid |
| 2020/0057488 A1 * | 2/2020 | Johnson ............... G01C 21/005 |
| 2021/0048544 A1 * | 2/2021 | Wolfel ................. G01V 1/3852 |
| 2021/0302966 A1 | 9/2021 | Zhang et al. |
| 2021/0364289 A1 | 11/2021 | Rzhanov |

\* cited by examiner

APPARATUS AND METHODS FOR ARTIFICIAL INTELLIGENCE BATHYMETRY

FIELD OF THE INVENTION

The present invention generally relates to the field of bathymetry. In particular, the present invention is directed to apparatus and methods for artificial intelligence bathymetry.

BACKGROUND

Bathymetry is necessary for maritime logistics. However, common methods of mapping the ocean floor are arduous and timely.

SUMMARY OF THE DISCLOSURE

In an aspect of the present disclosure is an apparatus for artificial intelligence (AI) bathymetry, the apparatus including an sonic unit attached to a boat, the sonic unit configured to transmit a plurality of ultrasonic pulses; receive a plurality of return pulses; and generate a plurality of metric data as a function of the plurality of ultrasonic pulses and the plurality of return pulses; an image processing module communicatively connected to the sonic unit, the image processing module configured to generate a bathymetric image as a function of the plurality of metric data; identify, as a function of the bathymetric image, an underwater landmark; and register the bathymetric image to a map location as a function of the underwater landmark; a communication module configured to transmit the registered bathymetric image to at least a remote device; and an autonomous navigation module installed on the boat, the navigation module communicatively connected to at least a boat control, the autonomous navigation module configured to determine a heading for the boat as a function of a path datum; and command the at least a boat control to navigate the boat as a function of the heading.

In another aspect of the present disclosure is a method for artificial intelligence (AI) bathymetry, the method including transmitting, at an sonic unit, a plurality of ultrasonic pulses; receiving, at the sonic unit, a plurality of return pulses; generating, at the sonic unit, a plurality of metric data as a function of the plurality of ultrasonic pulses and the plurality of return pulses; generating, at an image processing module, a bathymetric image as a function of the plurality of metric data; identifying, at the image processing module, as a function of the bathymetric image, an underwater landmark; registering, at the image processing module, the bathymetric image to a map location as a function of the underwater landmark; determining, at an autonomous navigation module, a heading for the boat as a function of a path datum; and commanding, at the autonomous navigation module, at least a boat control to navigate the boat as a function of the heading, wherein the at least a boat control is communicatively connected to the autonomous navigation module.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for artificial intelligence bathymetry. In an embodiment, an apparatus includes a sonic unit attached to a boat. The sonic unit may include one or more sensors to measure the distance to an ocean floor and/or lake floor by transmitting and detecting soundwaves. The apparatus also includes an image processing module communicatively connected to the sonic unit, which may use a machine-learning process to process data from the sensors and generate an image of the ocean floor. The image processing module may also use point cloud georegistration to association each point of the image with a geolocation. The image processing module may identify and resolve inconsistencies of data in a surveyed area. The apparatus is configured to generate a deliverable map of the ocean floor. Exemplary embodiments illustrating aspects of the present disclosure are described below in the context of several specific examples.

Figure 1:
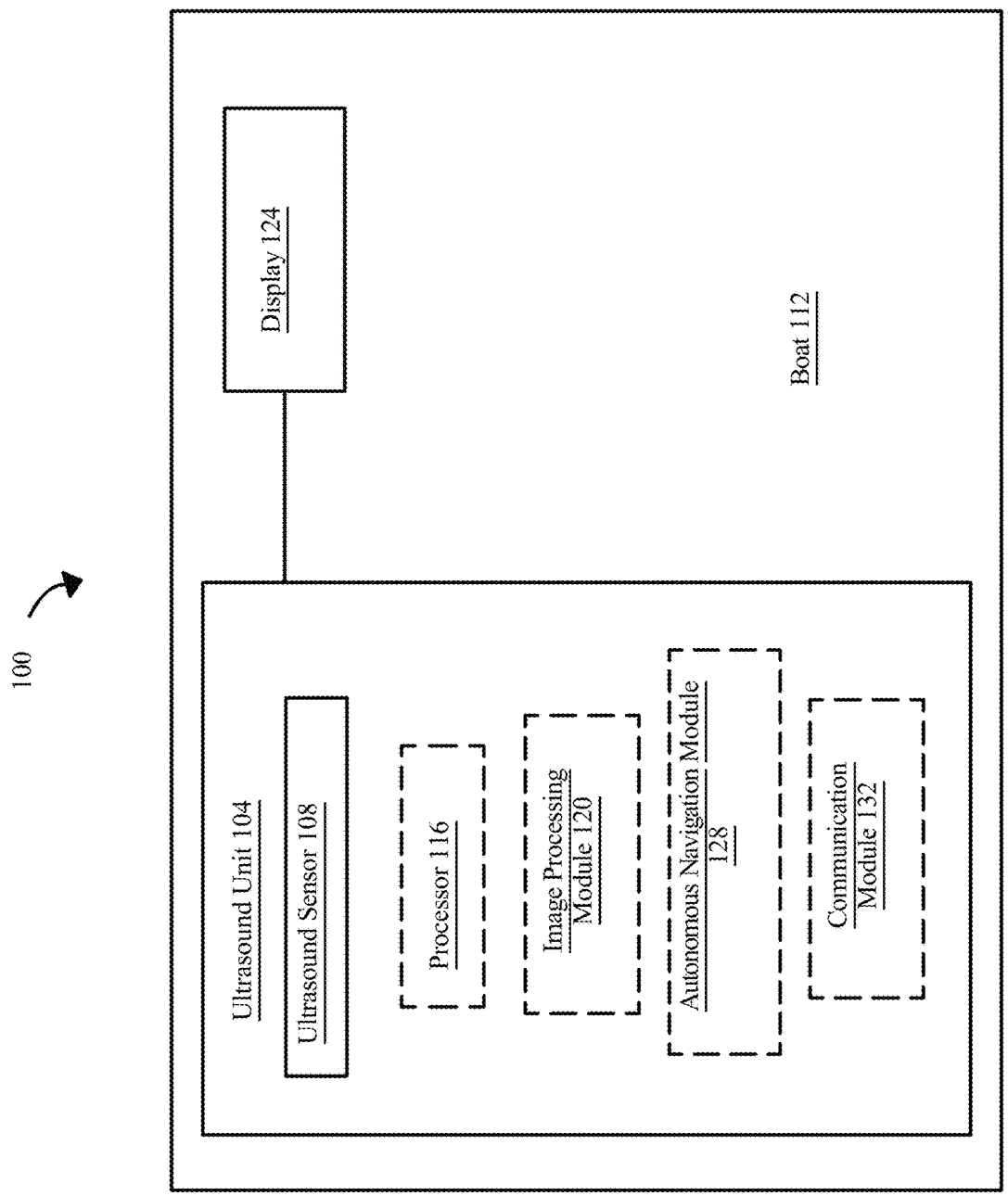
FIG. 1 is a block diagram illustrating an apparatus for artificial intelligence bathymetry.

Now referring to FIG. 1, an apparatus for artificial intelligence (AI) bathymetry is illustrated. Apparatus 100 may include a sonic unit 104 attached to a boat 112. Sonic unit 104 may be mounted to boat 112. Sonic unit 104 is configured to transmit a plurality of sonic pulses, which may include sonar pulses and/or ultrasonic pulses; plurality of pulses may be transmitted at a bathymetric survey area, which is defined for the purposes of this disclosure as a floor of an ocean, lake, river, and/or estuary. As used in this disclosure, an "ultrasonic pulse" is a soundwave pulse with a frequency above the upper limit of human hearing. A sonic pulse may include pings and/or sonar beams. Sonic unit 104 may use sound waves to measure and produce images of an underwater environment. Sonic and/or sonar pulses may be emitted at frequencies ranging from infrasonic frequencies in a range of 1-5 kHz, medium frequencies at a arrange of 5-15 kHz, high audible frequencies of 15-20 kHz, and/or ultrasonic frequencies above 20 kHz. Ultrasonic pulses may be emitted in frequencies in the 200-700 kHz range. In some embodiments, frequencies employed may range between about 150 kHz and about 450 kHz.

With continued reference to FIG. 1, apparatus 100 may be configured to select sounds to output from a plurality of sounds, which may be stored, without limitation, in a lookup table, database, or other memory of apparatus 100. Sounds may be selected automatically, for instance and without limitation to create improved signal to noise ratio and/or as dictated by one or more hydrological conditions as described in further detail below. Apparatus 100 may alternatively or additionally allow a user on boat 112 and/or at a remote device to change the sounds. Sound file may be stored in a WAV format or any other format for a sound file known in the art. Apparatus 100 may include a sound board configured to receive a USB or any other memory device. Boat 112 may upload a sound file from the USB or other memory device to emit. Sonic unit 104 is configured to receive plurality of return pulses. As used in this disclosure, a "return pulse" is an ultrasound pulse that that has reflected off an object, such as an ocean floor. Sonic unit 104 may include an ultrasound sensor 108. Ultrasound sensor 108 may include one or more sensors such as sonar, INS, and/or a sound velocity sensor. Ultrasound sensor 108 may be configured to detect and measure a soundwave metric. As used in this disclosure, a "soundwave metric" is a velocity of a soundwave, a wavelength of a soundwave, and/or a time elapsed from the moment a soundwave was emitted to the moment the soundwave was detected.

Still referring to FIG. 1, sonic unit 104 may include a side-scan sonar device. Side-scan sonar devices are constructed to emit conical or fan-shaped pulses down toward a seafloor across a wide-angle perpendicular to a path traversed by apparatus 100, sonic unit 104 and/or a craft on which it is mounted, an intensity of acoustic reflections from the seafloor of this fan-shaped beam may be recorded in a series of cross-track slices. When stitched together along the direction of motion, these slices may form an image of the sea bottom within a swath of a beam, where the swath is defined as a coverage area of the beam. Sound frequencies used in side-scan sonar may range from 100 to 500 kHz; with higher frequencies producing better resolution but with less range. In a non-limiting embodiment, side-scan sonar may be performed using multibeam echosounders (MBES). MBES may use hundreds of very narrow adjacent beams arranged in a fan-like swath of typically 90 to 170 degrees across. A number of beams may be any suitable number, including without limitation about 256 beams. In embodiments, a tightly packed array of narrow individual beams may provide very high angular resolution and accuracy. In general, a wide swath, which may be depth dependent as described in further detail below, may allow apparatus to map more seafloor in less time than a single beam echosounder by making fewer passes. Beams may update at regular and/or periodic intervals, which may be many times per second; for instance, beams may emit at a frequency of 0.1-50 Hz depending on water depth. In some embodiments, rapid beam emission may permit apparatus 100 to traverse and map a sea floor area and/or channel more rapidly, and/or to improve signal to noise ratios, for instance and without limitation as described below.

Still referring to FIG. 1, sonic device 104 may include, without limitation, a synthetic aperture sonar device. Synthetic aperture sonar (SAS) technology may use a forward motion of a small physical array to synthesize a much longer array, thus resulting in a much finer along-track resolution and higher signal to noise ratios than that of a physical array. In some embodiments, SAS may allow for much higher resolutions at lower frequencies than side-scan sonar systems. For instance, SAS devices may operate at less than 100 kHz; this may cause for increased range and/or depth of scans and/or for higher relative bandwidths.

Continuing to refer to FIG. 1, sonic unit 104 may output a plurality of sonic pulses and/or beams having a plurality of characteristics, including without limitation a plurality of frequencies, intensities, beam forms, or the like. Plurality of types of sonic pulses may be saved in and/or retrieved from memory of and/or communicatively connected to sonic unit 104. Sonic unit 104 may be configured to mix sounds together either concurrently or sequentially; for instance, sonic unit 104 may receive one or more instructions to mix sounds together in one or more ways. Sonic unit 104 may receive one or more instructions to select one or more sound files and/or to output at particular frequencies, intensities, pulse shapes, or the like. Selections of sounds, sequences, and the like may be performed for the purposes of error correction and/or detection, and/or may be selected based on hydrological conditions as described in further detail below.

Further referring to FIG. 1, sonic unit 104 may be configured, without limitation, to condition an emitted and/or return signal. Sonic unit 104 may include a filter, which may perform pulse compression and/or beamforming. In general, sonic unit 104 may include any components and/or configuration that may occur to persons skilled in the art upon reviewing the entirety of this disclosure. Filters, which may include digital and/or analog filters, may include without limitation band-stop filters configured to block specific frequencies corresponding to frequent and/or likely sources of noise. Filters may include band-pass filters that exclude frequencies outside of a range or band of frequencies expected in return signals. Filters may alternatively or additionally include digital filters configured to exclude patterns and/or distributions of noise such as Gaussian noise, pink noise, or the like. In some embodiments, parameters of filters, orders of filters, types of filters, and/or combinations of multiple filters may be selected using a machine-learning process; for instance, a neural network may be trained to filter examples of noise encountered in various natural circumstances using a set of temporally spaced images of identical bathymetric features, where inconsistencies may be learned as noise to be eliminated. For instance, an error function using in a learning process may be a function of differences between images.

With continued reference to FIG. 1, ultrasound sensor 108 may be configured to generate at least a metric datum using detected return signals. As used herein, a "metric datum" is an element of data encoding one or more soundwave metrics in an electrical signal such as a binary, analog, pulse width modulated, or other signal, using return signals. For example, and without limitation, ultrasound sensor 108 may transduce a detected phenomenon and/or characteristic of soundwaves discussed in this disclosure into a sensed signal. Ultrasound sensor 108 may detect a plurality of data about soundwaves. Specifically, sound velocity sensor may be configured to detect a velocity of a soundwave and generate metric datum encoding one or more metrics of the velocity of the soundwave. In embodiments, sonic unit 104 may be configured to generate a plurality of metric data as a function of as a function of the plurality of sonic pulses and the plurality of return pulses. Metric data may include, without limitation, time of flight data. In an embodiment, "time of flight" (TOF) data is data generated by measuring elapsed time between an emission of a pulse and detection of a return pulse; time of flight data may be utilized to reconstruct dimensioning and/or distances, using at least one path of a sound wave, by calculating distances traversed using time of flight and one or more data describing speed of sound in the water column. In an exemplary TOF analysis, geometry of structures may be inferred from one-dimensional or two-dimensional ultrasound pressure readout; in other words, as the ultrasound wave propagates across optical or other structural boundaries a portion of the energy may be reflected back to the launching interface which may be detectable. This Time of Arrival (TOA) may be used to correlate structural information based on known acoustic phase velocity. TOF may be combined with inference of density of structures measured along the path, using at least one path of the wave. Ultrasound may be pulsed from a two-dimensional transducer array; TOF from a two-dimensional grid may be used to reconstruct dimensioning and curvature of ocean floor, for instance by correlating relative pulsatile arrival times across an entire acoustic array to reconstruct anatomical geometries. Alternatively or additionally, a shape of a surface, such as a sunken ship, may be deduced using resonance; for instance, resonance of a hull of the sunken ship may be used, including without limitation as detected via ultrasound frequency sweep and measurement, via frequency shift or amplitude peaks or reflected ultrasound directly, via interferometry, and/or any combination thereof. For example, a shape and features of a channel may be deduced. This may be done, for example by measuring phase shifts across pulses of doppler r. Phase shifts may then be utilized to determine range and velocity of an object. In an embodiment, ultrasound may be pulsed from a one-dimensional transducer array.

Still referring to FIG. 1, metric data, including without limitation TOF data, may be determined and/or generated at least in part based on speed of sound along a path of a beam and/or pulse. Speed of sound may vary, without limitation, based on temperature, pressure, density, salinity, and/or other measurable parameters of a volume of water through which a sonic beam or pulse is passing. In some embodiments, speed of sound can vary in a water column due to changes in such measurable parameters. Speed of sound can also vary as a result of interfaces between currents, haloclines, or the like.

In an embodiment, and with further reference to FIG. 1, speed of sound data may be measured using a speed of sound sensor (not shown). A speed of sound sensor may include a device which is lowered into the water on a cord or the like, which may include a sonic emitter and a sonic sensor which are spaced a fixed and recorded distance apart. Speed of sound sensor may repeatedly measure a time of flight between emitter and sensor as it is moved through water column, which time of flight may be used to measure and/or map local speed of sound at various points a volume of water in which sonar is to be employed. Speed of sound sensor may be periodically deployed to sample speeds of sound, and/or may be continuously deployed to measure speeds of sound continuously. Speed of sound sensor may store measurements and/or calculate velocities locally using any local memory and/or processor, and/or may convey measurements and/or velocities continuously and/or in batches via a communicative connection to apparatus 100 and/or sonic unit 104. Speed of sound may alternatively or additionally be determined using calculations and/or models based on measured, sensed, and/or derived hydrological parameters, for instance and without limitation as described in greater detail below. Sonic unit 104 may include one or more sensors and/or components suitable for measuring one or more parameters and/or hydrological data. For instance, sonic unit 104 may include a temperature sensor configured to measure a temperature of water, a salinometer configured to measure a salinity of water, or the like.

With continued reference to FIG. 1, sonic unit 104 may include an inertial navigation system (INS). INS may include one or more motions sensors and/or rotation sensors. INS may be configured to determine a position, orientation, and/or velocity of a moving object without requiring external references. An INS may include, without limitation, one or more accelerometers, which may include, for instance, a set of three or more accelerometers that span three degrees of freedom to track acceleration in three dimensions. An INS may include, without limitation, one or more gyroscopes, which may include, for instance, a set of three or more gyroscopes that span three degrees of freedom to track rotation in three dimensions. An INS may include, without limitation, a magnetometer to sense position relative to a magnetic field such as the magnetic field of the Earth. INS may be used, without limitation, to determine and/or sense attitude. Attitude sensing may allow for the correction of roll and pitch on the ocean surface of apparatus 100 and/or a boat on which apparatus 100 is installed. A gyrocompass may be included to provide accurate heading information and/or to correct for vessel yaw. Sonic unit 104 may include an optical/radar/Lidar and/or a Global Positioning System (GPS), which may be used to detect a location and/or speed of boat 112. Sonic unit 104 may be electrically connected to boat 112 and may be powered by a power source of boat 112, such as a battery and/or generator, by receiving an electric current, for example 110 volts of alternating current. Sonic unit 104 may include one or more cast reels attached to sound velocity sensor.

With continued reference to FIG. 1, apparatus 100 may include a processor 116 communicatively connected to sonic unit 104. Sonic unit 104 may include processor 116. In some embodiments, processor 116 may be remote from sonic unit 104. "Communicatively connected," for the purposes of this disclosure, is a process whereby one device, component, or circuit is able to receive data from and/or transmit data to another device, component, or circuit. Communicative connection may be performed by wired or wireless electronic communication, either directly or by way of one or more intervening devices or components. In an embodiment, communicative connection includes electrically connection an output of one device, component, or circuit to an input of another device, component, or circuit. Communicative connection may be performed via a bus or other facility for intercommunication between elements of a computing device. Communicative connection may include indirect connections via "wireless" connection, low power wide area network, radio communication, optical communication, magnetic, capacitive, or optical connection, or the like. In an embodiment, communicative connecting may include electrically connecting an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, or optical connection, or the like.

Still referring to FIG. 1, processor 116 may include and/or be incorporated in any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 116 may include a single computing device operating independently, or may include two or more computing device operating in concert, in parallel, sequentially or the like; two or more computing devices may be included together in a single computing device or in two or more computing devices.

With continued reference to FIG. 1, processor 116 may be designed and/or configured to perform any method, method step, or sequence of method steps in any embodiment described in this disclosure as performed by sonic unit and/or apparatus, in any order and with any degree of repetition. For instance, processor 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 116 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Apparatus 100 may be configured to perform multibeam mapping in which sonic unit 104 transmits ultrasonic pulses, or pings, including sonar beams dispersed over a wide angle through the water that are reflected off the ocean floor and return to boat 112. Sonic unit 104 may transmit soundwaves at a single frequency. In some embodiments, sonic unit 104 may transmit soundwaves at various frequencies.

Still referring to FIG. 1, apparatus 100 may include an image processing module 120 communicatively connected to sonic unit 104; image processing module 120 may incorporate a processor, which may include any processor suitable for use in sonic unit. Image processing module 120 may incorporate or be incorporated in sonic unit 104, and/or may be a separate unit communicatively connected to sonic unit 104. Image processing unit 120 may be designed and/or configured to perform any method, method step, or sequence of method steps in any embodiment described in this disclosure as performed by sonic unit and/or apparatus, in any order and with any degree of repetition. For instance, image processing unit 120 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Image processing unit 120 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With further reference to FIG. 1, image processing module 120 may be configured to generate a bathymetric image as a function of plurality of metric data. As used in this disclosure, a "bathymetric image" is a digital image representing underwater land surfaces and/or water depth of any bathymetric survey area. Bathymetric image may alternatively or additionally be based in part on a temperature of the water and/or a salinity of the water. Bathymetric image may include two-dimensional topographic image, a three-dimensional image rendered using voxels, vectors, polygon meshes, or the like, and/or any other suitable form of image for showing bathymetric data. Bathymetric image may include an image showing depth, volume, and/or other characteristics of shipping channels.

Still referring to FIG. 1, image processing module 120 may use metric data from a one-dimensional grid may be to reconstruct dimensioning and curvature of ocean floor to produce a three-dimensional image. Production of a three-dimensional image may be performed at least in part using a Fourier transform. Fourier transform may decompose a signal into the frequencies that make it up. Fourier transform may be used in image analysis to assist in image reconstruction. For example, Fourier transform may deconstruct a waveform into its sinusoidal components such as sine and/or cosine. Fourier transform allows for a waveform representing a function or signal to be represented in an alternate form, such as a reconstructed image. Fourier transform may be utilized to reconstruct dimensioning and curvature of the ocean floor or other structure from one-dimensional, two-dimensional, and/or three-dimensional images into three-dimensional or four-dimensional images. Fourier transform may assist in producing images that can be used to track changes over time, such as changes to a channel. Echoes may occur at the interface of an acoustic impedance change, e.g. from water to earth. Knowing the acoustic phase velocity may allow for the calculation of thickness of objects underwater, such as coral reef. In addition, Fourier transform may allow for ocean floor and underwater objects to be reconstructed from pulses and TOA measurements to produce for example, one-dimensional, two-dimensional, three-dimensional, and/or four-dimensional images. Fourier transform may be accomplished, without limitation, by using computation techniques such as, but not limited to, fast Fourier transform (FFT).

Further referring to FIG. 1, ultrasound images may be categorized based on the dimension of the ultrasound readout. For example ultrasound images may include one-dimensional, two-dimensional, three-dimensional, or other images. One-dimensional images may include images relating to a single dimension. Two-dimensional images may include images in which two parameters are required to determine the position of a point. Three-dimensional images may include images in which three parameters are required to determine the position of a point. This may include for example, Cartesian (x, y, z) coordinates, cylindrical or spherical polar coordinates, or the like. Additional variables aside from position may be represented using, e.g., colors, intensity, and/or supplemental plots. Ultrasound may be utilized to reconstruct dimensioning of a floor under a body of water, such as an ocean floor, a canal floor, and the like. As used in this disclosure, "ocean floor" includes the surface of a floor under any body of water such as an ocean, river, canal, etc., unless otherwise stated. Ultrasound may be concentrated to a certain region of the of the body of water such as an entrance channel to a harbor.

Still referring to FIG. 1, ultrasound may include doppler ultrasound which may produce images of fluid flow, and/or fluid pressure within an area, such as water flow and water pressure in the ocean. Doppler ultrasound may be utilized to detect a Doppler shift imposed by a flowing water and/or object on a periodic signal such as a light or sound wave reflected or emitted by the water and/or object, such as for example a change of current through a canal. Doppler ultrasound may be utilized to detect changes in frequency or wavelength of a wave, reflecting a shift or change of a flowing fluid or other moving object or body of material. Doppler ultrasound may produce one-dimensional, two-dimensional, three-dimensional, and/or four-dimensional images as described in more detail above. Images produced by ultrasound including doppler ultrasound may be in black and white, greyscale, and/or color. Ultrasound may include ultrasound-modulated tomography. Tomography may include imaging by sections through the use of a penetrating wave using a tomograph. For example, tomography may include cross-sectional imaging that produces slices of ocean floor. Images may be reconstructed into a slice of the selected anatomy. Images may be produced based on tomographic reconstruction such as for example by the use of mathematic algorithms. Mathematical algorithms may include for example, filtered back projections and/or iterative reconstruction.

With continued reference to FIG. 1, image processing module 120 may be configured to detect at least a hydrological condition and calibrate image processing module 120 and/or sonic unit 104 as a function of the detected at least a hydrological condition. As used in this disclosure, a "hydrological condition" is a condition of a volume of water through which sonar is propagating that affects speed or other parameters of propagated sound, image quality, or the like. For example, hydrological conditions may include temperature, pressure, local speed of sound, local density, salinity, concentration of suspended particulates such as silt, aeration level, and/or impeding objects such as kelp, flotsam, garbage, or the like. In some embodiments, one or more aspects of bathymetric image and/or return signal may be affected by one or more hydrological parameters. For instance, and without limitation, sonar operation may be affected by variations in sound speed, particularly in a vertical plane. As a non-limiting example, sound may travel more slowly in fresh water than in sea water. Generally, speed of sound in water may be determined by a bulk modulus and mass density of water. Bulk modulus may be affected by temperature, dissolved impurities such as salinity, and pressure. Density may have a small effect as well. Speed of sound $V_s$ in feet per second through a given volume of water having such parameters may be calculated as:

$$V_S = 4388 + 11.25T + 0.0182D + S$$

where T is the temperature in degrees Fahrenheit, D is depth in feet, and S is salinity in parts per thousand. However, this equation may not hold true in all temperatures, salinities, and depths. Moreover, temperature and salinity may change with depth. For instance ocean temperature may vary with depth; as a non-limiting example, between 30 and 100 meters there is often a marked change, called the thermocline, dividing warmer surface water from cold, still waters that make up the rest of the ocean. This may frustrate sonar, because a sound originating on one side of a thermocline tends to be bent, or refracted, through the thermocline. Thermocline may be present in shallower coastal waters. However, wave action may often mix the water column and eliminate thermocline. Water pressure may also affect sound propagation, for instance with higher pressure increases speed of sound which may cause sound waves to refract away from the area of higher sound speed, for instance according to Snell's law.

In some embodiments, and with further reference to FIG. 1, image processing module 120 may use one or more computational processes to determine speed of sound over different portions of a water column traversed by sonic beams and/or pulses. For instance, where speed of sound at different depths of a local water column have been determined, image processing module 120 may integrate speed of sound over a path traversed by a pulse, beam, and/or return signal to determine an overall speed and thus time of flight. Alternatively or additionally, where speed of sound at different depths has not been measured directly, image processing module 120 may determine and/or estimate speed of sound at different depths, and then may integrate over paths traveled by beams, pulses and/or return signals, and/or may integrate known and/or measured parameters over such paths before using such parameters in a speed of sound and/or TOF determination.

In some embodiments, and with continued reference to FIG. 1, image processing module 120 may use one or more machine-learning processes and/or models to estimate parameters affecting local speed of sound, to determine a locally valid mathematical relationship between such parameters and the local speed of sound, and/or to determine likely local speeds of sounds at varying depths given one or more known parameters. For instance, a parameter estimation machine-learning model, in any form as described in this disclosure, may be trained using any machine-learning process described in this disclosure using training data that correlates one or more previously recorded parameters corresponding to measured and/or known parameters to one or more previously recorded parameters that are not currently measurable and/or known. Known and/or measured parameters may be input to parameter estimation machine-learning model, which may output not currently known and/or measurable parameters. As a further example, a velocity estimation machine-learning model, in any form as described in this disclosure, may be trained using any machine-learning process described in this disclosure using training data that correlates one or more previously recorded parameters corresponding to local speeds of sound in corresponding volumes of water. Known and/or measured parameters may be input to velocity estimation machine-learning model, which may output not local speeds of sound.

Still referring to FIG. 1, image processing module 120 may be configured to detect a local distortion pattern such as a diffractive distortion caused by a thermocline and/or halocline. For instance, and without limitation, image processing module 120 may generate an initial bathymetric image, detect a local distortion pattern, and perform calibration as described below to correct the local distortion pattern. In some embodiments, image processing device may detect local distortion pattern using an image classifier, which may be denoted for purposes of this disclosure as a "distortion classifier" configured to classify bathymetric images to local distortion patterns. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Image processing module 120 and/or another device may generate a classifier using a classification algorithm, defined as a processes whereby a device derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Further referring to FIG. 1, image processing module may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 116 may then calculate a likelihood table by calculating probabilities of different data entries and classification labels. Processor 116 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 116 may be configured to generate classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, classifiers may include without limitation neural network classifiers. A neural network classifier is implemented using a neural network, for instance and without limitation as described below, which is trained using training data that correlates instances of images with categories to which such images are classified, including without limitation categorization of images as evincing one or more local distortions. Neural network may include, without limitation, a deep learning network, a recurrent neural network, and/or a convolutional neural network, as well as two or more such networks arranged concurrently and/or recurrently. Neural network may include an input per pixel and/or voxel of a bathymetric image and/or a portion thereof. Training data may alternatively or additionally be used to train other forms of classifiers as described above.

Further referring to FIG. 1, image processing module 120 may be configured to determine a degree of noise, and/or a signal to noise ratio, in bathymetric image. In an embodiment, image processing module 120 may measure a degree of pixel-to-pixel variation to estimate a degree of random noise, where higher degrees of overall variation may indicate higher levels of noise. Alternatively or additionally, a Fourier transform of image may be used to determine a prevalence of signal components in frequency ranges indicative of higher degrees of noise and/or a degree of similarity in patterns of intensity at different frequency levels to known and/or expected patterns of noise. Alternatively or additionally, image processing module 120 may determine a degree of blurriness in an image by taking Fourier transform, or an approximation such as an FFT, of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 1, image processing module 120 may be configured to calibrate sonic unit 104 and/or to perform one or more mitigating measures to counteract distortion, noise, or other sources of error in bathymetric images. Mitigation and/or calibration may be performed, without limitation, by modifying one or more parameters of image analysis and/or governing emission, reception, and/or filtration of sonic signals, followed by a re-determination of a degree of distortion, noise, and/or other sources of error; this may be performed iteratively until degree of distortion, noise, and/or other sources of error has reduced below a threshold level. Modification may be performed, without limitation, by retrieving one or more elements of data associated with a detected distortion, degree of blurriness, noise, and/or error, where the one or more elements of data indicate parameters to adjust. Adjusted parameters may include, without limitation, one or more local speeds of sound along paths traversed by beams and/or in water column, one or more parameters described above as affecting speed of sound, including temperature, pressure, depth, salinity, or the like, an emission frequency of one or more pulses or beams of sound to be emitted, a mix of different emissions and/or frequencies to be emitted, one or more bands to be blocked by band-stop filters, one or more noise patterns to be eliminated, or the like.

Still referring to FIG. 1, one or more corrective procedures performed by image processing module 120 may include an increase in overlap between swaths, which may be effected by causing passes over the ocean floor to be made closer together using navigation devices and/or processes as described below, use of a second pass over a given area to be mapped, including without limitation a second pass at a different traversal angle from a first pass, by a different boat and/or apparatus, or the like. Reconciliation between distinct passes and/or using overlaps of swaths may be used to increase signal-to-noise ratio and/or decrease error and/or distortion.

Still referring to FIG. 1, error correction and/or calibration may be performed to address one or more specific sources of error and/or distortion. For instance, mitigation and/or calibration may be used to reduce effects of scatter. In some embodiments, scattering occurs from small objects in the sea as well as from the bottom and surface. Acoustic scattering may be analogous to scattering of the light through a turbid medium such as fog, where a high-intensity or "pencil" beam may penetrate more successfully with reduced backscatter. Sonar and/or emitted beams may be narrowed to reduce effects of scattering.

As a further non-limiting example, and still referring to FIG. 1, image processing module 120 may perform phase error corrections. This may be accomplished, without limitation, by Cutting bathymetric image into small regions where phase error is constant, which regions may be used for independent measurements. For instance, where a variation in phase error across bathymetric image is greater than an error threshold, image processing module 120 may split bathymetric image into sub-regions. Sub-regions may be of equal sizes or of different sizes. Sub-regions may be of varying sizes such that a size variation may be based on a range. Image processing module 120 may estimate a phase error for each sub-region and determine if a variation in phase error across each subregion is less than a phase error threshold. If a phase error in a particular subregion is less than an error threshold, that particular subregion may be corrected for a corresponding phase error, which may be substantially constant across the entirety of the particular subregion. If a phase error is greater than a threshold then a subregion may be split into smaller subregions, each of which may be subjected to the same process of threshold comparison followed by correction and/or further partition.

Continuing to refer to FIG. 1, image processing module 120 is configured to identify, as a function of the bathymetric image, an underwater landmark. An "underwater landmark," as used herein, is a substantially permanent feature of sea floor and/or shipping channel that may be used to identify a location and orientation of bathymetric image with respect to previously existent maps, soundings, bathymetric images, shipping channel data, or the like. Image processing module 120 may identify a plurality of underwater landmarks. Identification may be performed by comparison of bathymetric image with one or more existing images of an underwater landmark, which may be stored by apparatus 100 in a database of such images. Database may be implemented in any manner suitable for implementation of a database as described in further detail below. Alternatively or additionally, image of underwater landmark may be received from a remote device, and/or bathymetric image or a portion thereof may be transmitted to a remote device, which may identify landmark in bathymetric image and transmit a result to apparatus 100; in this case, image processing module 120 may be configured to identify underwater landmark based on the received identification. As a further non-limiting example, image processing module 120 may be communicatively connected to a local and/or remote database of maps or identified landmarks, such as Army Corps landmarks, to perform landmark recognition.

Still referring to FIG. 1, image processing module 120 may identify landmark comparing a feature of bathymetric image to at least a stored image. Comparison may be performed using a landmark classifier which may include any type of classifier as described in this disclosure. Landmark classifier may be trained using training data that correlates previously capture images of landmarks to identifications thereof. Training data may be collected during previous iterations of methods described herein, identified by users, or the like.

With further reference to FIG. 1, image processing module 120 is configured to register bathymetric image to a map location as a function of the underwater landmark and/or as a function of a plurality of identified underwater landmarks. "Registration," as used in this disclosure, is a process whereby bathymetric image is scaled and oriented relative to one or more existing maps so that bathymetric image could be accurately inserted on such maps. In some embodiments, registration may be performed by image processing module 120 by transmission via a communication module to a remote device as described in further detail below, and reception of registration data therefrom, which registration data may be used by image processing module 120 to perform registration. Alternatively or additionally, image recognition module may perform one or more registration processes to register bathymetric image to map.

As a non-limiting example, and still referring to FIG. 1, image processing module 120 may perform point cloud georegistration to localize each point in images, meaning that each point is assigned a location on a three-dimensional coordinate system of the earth and positioned on the coordinate system. Image processing module 120 may also use gridding on images, wherein sections of an image are each given a discrete representation. Image processing module 120 may receive raw signal data, such as raster data. As used in this disclosure, "raster data" are digital aerial photographs, satellite images, digital pictures, or scanned maps that include real-world phenomena. Image processing module 120 may receive continuous raster data and/or discrete raster data. An example of real-world phenomena that raster data may include is water depth. Image processing module 120 is configured to register the bathymetric image to a map location as a function of an underwater landmark. Image processing module 120 may use landmark recognition to determine a location and/or to georegister in image or a portion of an image. Image processing module 120 may recognize a landmark by comparing it to at least a stored image.

Still referring to FIG. 1, image processing module 120 may make use of one or more other data to aid in registration, including without limitation in local registration processes performed by communication with a remote device. For instance and without limitation, a boat-mounted Global Positioning System (GPS) global navigation system using satellites, or the like may be used to aid in positioning bathymetric image with respect to the surface of the earth and/or seafloor.

With continued reference to FIG. 1, image processing module 120 may be configured to map floor and/or water depth, including the underwater floor of channels, based on the images received. In some embodiments, image processing module 120 may apply data to existing maps of channels and other waterways. For example, image processing module 120 may include a visual representation of water depth on a map. Image processing module 120 may color code ranges of water depth. Image processing module 120 may color code ranges based on a hull draft of a client. For example, if a client's hull draft is thirty feet, then image processing module 120 may generate a map that is colored green where the water depth is greater than fifty feet, yellow where the water depth is between thirty-five feet and fifty feet, and red where the water depth is less than thirty-five feet. Image processing module 120 may alter coloration on map with a color slider. Sonic unit 104 may be removably attached to boat 112 for hire to periodically collect data of waterways such as channels. Sonic unit 104 may use the data collected to track changes to channels. Sonic unit 104 may also be attached to an autonomous boat 112, as discussed below, to collect data.

Still referring to FIG. 1, image processing module 120 may be configured to predict changes to channels based on previous changes to channels and correlating factors such as time lapsed, weather conditions, seasons, and the like. Image processing module 120 may base predictions on data it has gathered from surveys and/or information collected from external sources. Such predictions may be performed, without limitation, as described in detail below regarding predictions effected by one or more remote devices. Similarly, image processing module 120 and/or one or more remote computing devices may perform patch-testing, calibration routines at one or more levels, distortion correction around thermoclines, and/or the like.

Still referring to FIG. 1, apparatus 100 may include a display 124 communicatively connected to sonic unit 104 and/or image processing module 120. Sonic unit 104 may transmit datum such as soundwave datum for display 124 to represent visually. Display 124 may include one or more screens, which may be multi-function displays (MFD). Display 124 may include a liquid crystal display (LCD) and/or one or more projected lasers. Apparatus 100 may include a graphical user interface (GUI) displayed on display 124. Display 124 may include an augmented reality display. As used in this disclosure, an "augmented reality" display is a display that permits a user to view a typical field of vision of the user and superimposes virtual images on the field of vision. As an example, and without limitation, GUI may be displayed on any electronic device, as described herein, such as, without limitation, a computer, tablet, remote device, and/or any other visual display device. Augmented reality display may make use of reflective waveguides, diffractive waveguides, lenses, or the like to transmit, project, and/or display images. Augmented reality display may include a view window, defined for the purposes of this disclosure as a portion of the augmented reality device that admits a view of field of vision; view window may include a transparent window, such as a transparent portion of goggles such as lenses or the like. Alternatively, view window may include a screen that displays field of vision to user. Augmented reality display may include a projection device, defined as a device that inserts images into field of vision. Where view window is a screen, projection device may include a software and/or hardware component that adds inserted images into a display signal to be rendered on augmented reality display. Augmented reality display may include a heads-up display (HUD). Augmented reality display may be positioned in or near the line of vision of an operator of sonic unit 104 to allow the operator to view visual representation while maintaining vision necessary for safe operation of the sonic unit 104. In some embodiments, augmented reality display may display images on one or more transparent surfaces. One or more transparent surfaces may be windows of boat 112. In some embodiments, augmented reality display may include an augmented reality headset. For instance, and without limitation, augmented reality display may project images through and/or reflect images off an eyeglass-like structure and/or lens piece, where either both field of vision and images may be so displayed, or the former may be permitted to pass through a transparent surface. Augmented reality display may be incorporated in a contact lens or eye tap device, which may introduce images into light entering an eye to cause display of such images. Augmented reality display may display some images using a virtual retina display (VRD), which may display an image directly on a retina of a user. GUI may provide a visual representation of checks with yellow and red marks, such as "X" to help user ensure that artificial intelligence of sonic unit 104 does not unintentionally bounce back when it intersects a line. Sonic unit 104 may use an algorithm to ensure that robot does not follow any line or directions that are not meant for it.

Still referring to FIG. 1, display 124 may implement a stereoscopic display. A "stereoscopic display," as used in this disclosure, is a display that simulates a user experience of viewing a three-dimensional space and/or object, for instance by simulating and/or replicating different perspectives of a user's two eyes; this is in contrast to a two-dimensional image, in which images presented to each eye are substantially identical, such as may occur when viewing a flat screen display. Stereoscopic display may display two flat images having different perspectives, each to only one eye, which may simulate the appearance of an object or space as seen from the perspective of that eye. Alternatively or additionally, stereoscopic display may include a three-dimensional display such as a holographic display or the like. Persons skilled in the art, upon reviewing the entirety of this disclosure, will be aware of various alternative or additional types of stereoscopic display that may be employed in an augmented reality device. In some embodiments, display may include a touch screen to receive input from a user.

Still referring to FIG. 1, apparatus includes a communication module 132 configured to transmit the registered bathymetric image to at least a remote device. Communication module 132 may be configured to transmit bathymetric data to a remote device, as described below. As used in this disclosure, "bathymetric data" is data making up a bathymetric image, data encoding one or more metrics of characteristics of a land surface underwater, positions of a land surface underwater, and/or water depth in an electrical signal such as a binary, analog, pulse width modulated, or other signal, and/or data collected by apparatus 100 using any sensors or the like. Communication module 132 may communicate with remote devices using any suitable network connection, including without limitation communications relayed via satellite, communications with and/or relayed by nearby vessels, wireless radio transmissions, or the like. Communication module 132 may communicate with other boats, ports, carriers, or the like.

Continuing to refer to FIG. 1, apparatus 100 includes an autonomous navigation module 128 installed on boat 112. Autonomous navigation module 128 may contain a processor and/or memory, which may include any suitable processor, memory, and/or computing device as described in this disclosure. Autonomous navigation module may be separate from, may incorporate, may be incorporate in, and/or may be the same unit as sonic unit 104 and/or image processing module 120. Autonomous navigation module 128 is communicatively connected to at least a boat control 136. A "boat control," as used in this disclosure, is a device that actively affects a velocity and/or heading of a boat. A boat control 136 may include without limitation a propulsive device such as a propeller a steering device such as a rudder, and/or any actuators or circuits controlling such devices, such as without limitation steering and/or throttle controls.

Still referring to FIG. 1, autonomous navigation module 128 is configured to determine a heading for boat as a function of a path datum, and command the at least a boat control 136 to navigate the boat as a function of the heading. As used in this disclosure, a "path datum" is an element of data that indicates a path that a boat on which apparatus 100 is installed is to navigate. Path datum may include a path, which may be provided in terms of a heading, such as a heading on the compass, such as a number of degrees from the north or some equivalent thereof, in terms of a distance to traverse in kilometers, nautical miles, or the like. Path datum may further include a number of traversals to be performed parallel to a given heading in order to cover a region to be mapped; path datum may include distances between such traversals. Alternatively or additionally, path datum may include one or more elements of data from which such traversals, angles, and/or distances may be determined. For example, path datum may include an area to traverse and/or cover, from which the apparatus may determine headings, angles, and/or spacing of traversals. As a further non-limiting example, navigation module 128 may receive an area to traverse and a heading to follow on traversals. Headings, paths, traversals, turnarounds, and the like may be determined, without limitation, as described in further detail below. Autonomous navigation module 128 may receive and/or determine an area of seabed to traverse, setting up and/or receiving a direction of traversal (i.e. a direction parallel to which each pass is to occur, and setting up lines along which to traverse). Line selection may depend on depth (for swath width) a degree of overlap desired (depending on water quality). Among other factors-may change based on updated data, including from the sonar itself. Boat 112 may adjust survey in real time. Autonomous navigation module 128 may be configured to have boat 112 resume, if interrupted, from any point, skip a leg of survey, and/or return to another point on a survey mission. Autonomous navigation module 128 may be connected to controls on boat 112, such as a button, which can cease performance of the autonomous navigation module 128 and revert control back to manual. Autonomous navigation module 128 may include an alert that activates when control switches between autonomous control and manual control. Autonomous navigation module 128 may also be configured to control a fleet of boats. In some embodiments, each boat 112 includes an autonomous navigation module 128 which may coordinate the performance of one or more survey missions with other autonomous navigation module 128, wherein each boat 112 surveys distinct areas. In some embodiments, other boats are configured to receive commands from autonomous navigation module 128 that determines a route.

Further referring to FIG. 1, autonomous navigation module may be configured to receive an area of a body of water to survey from sonic unit 104 and/or a remove computing device. received area may be a rectangle, circle, or other shape identifying an area or a perimeter of an area of a body of water to survey. Autonomous navigation module 128 may generate a path datum based on the received area. As used in this disclosure, a "path datum" is an element of data encoding one or more metrics of a location of on a body of water in an electrical signal such as a binary, analog, pulse width modulated, or other signal. Path datum may include a traversal path 308 with a traversal angle. As used in this disclosure, a "traversal path" is a path for boat 112 to follow to perform a survey of the area received. Traversal path may include parallel line segments for boat 112 to follow. Line segments may extend past the area to ensure that boat 112 turning around does not affect the survey of area. Line segments may each be connected to adjacent line segments by an arc-shaped turnaround that allows boat 112 to turn around without altering the line segments within the area. Turnarounds may be based on a turning radius of boat 112. Thus, a turnaround may bow out from line segment if a turning radius of boat 112 exceeds half a distance between adjacent line segments. Distances between line segments may be consistent throughout traversal path. As used in this disclosure, a "traversal angle" is an angle formed by a line segment in traversal path and an identifier in a coordinate system, such as latitudinal axis, longitudinal axis, an x-axis, y-axis, z-axis, or any other axis. Sonic unit 104 may use artificial intelligence to generate traversal path. Autonomous navigation module 128 may use classical search algorithms to determine traversal path to take for surveying an area. Autonomous navigation module 128 may calculate spacing between line segments and/or traversal angles in traversal path. Autonomous navigation module 128 may calculate traversal path as a function of viewing conditions, angle of boat 112 relative to area or a portion of area, water depth, and/or the like. Viewing conditions may include an average local depth, which may be continually recalculated with corresponding adjustments to spacing of line segments. Viewing conditions may include an estimated error rate and/or signal to noise ratio. For example, if an error rate or signal to noise ratio reached a threshold, traversal path may be adjusted accordingly, such as decreasing a distance between line segments and/or increasing overlap in portions of area surveyed, which may improve the ability to correct errors.

Still referring to FIG. 1, areas may be surveyed with different traversal patterns. Autonomous navigation unit 128 may be given a traversal direction and automatically determine a series of lines and/or passes to follow accounting for turning radius to go out of a box, turn, and/or go straight in. Autonomous navigation unit 128 may receive a location to start a survey and perform the survey. Autonomous navigation unit 128 may have a tracking feature allowing a user and/or remote device to set track spacing to determine a fineness of grid. Track spacing may be automatically set based on depth in water. Additional overlapping may be commanded for autonomous navigation unit 128, for instance and without limitation when a location is less known or there is a lower confidence in other maps of the location. Sonic unit 104 may have a cross track controller configured to measure a traversal of earth. Cross track controller may measure a percentage of line gone over. Cross track controller may perform a cross-track check in frene space, also known as phrene space.

Continuing to refer to FIG. 1, autonomous navigation module 128 may direct boat controls 136 to steer and/or propel boat 112 on a heading and/or path as indicated by path datum. Control may be performed in any suitable manner, including using open-loop or closed-loop control. As a non-limiting example, control may include closed-loop control over heading, speed, and/or cross track. For instance, and without limitation autonomous navigation module 128 may use a hierarchical controller having an outer loop corresponding to position error; position error may be supplied by comparing a directed position as determined from path datum to a currently measured position. Currently measured position may be determined using one or more navigational aids, such as without limitation satellite navigation systems as described above, and/or updates to a previously known position using an INS, or any other components and/or methods for position determination that may occur to persons skilled in the art upon reading the entirety of this disclosure. Any suitable error function may be used for comparison, and may be used to direct boat controls 136 to minimize such error.

Still referring to FIG. 1, hierarchical controller may include a second or inner loop comparing a chosen heading based on path datum to a measured heading, which may be measured using any facilities and/or components suitable for measurement of position. A second error function may be used to correct heading, which may be applied in some embodiments after corrections to position have been entered. Heading feedback and/or correction may be used to minimize cross-track and determining how to turn rudder and/or propulsors to achieve a commanded heading, and determining how to change a rudder and/or other boat controls to minimize heading error. Further loops in hierarchical controller may be used to compute and/or minimize a rate of change of position and/or a rate of change of heading.

Continuing to refer to FIG. 1, autonomous navigation module 128 may control steering and/or throttle manual controls installed in boat 112, which may be operated so that a person on boat 112 is able to see them move. Autonomous navigation module 128 may actuate manual controls installed in boat 112 based on a setting of boat control 136, and may move them as if being moved by a person manually controlling them. In some embodiments, control may be effected by moving manual controls, which may be control boat controls 136 as configured for manual control. Alternatively or additionally, control signals may be transmitted electronically to boat controls 136 by autonomous navigation module 128, and manual controls may be configured to move correspondingly in response to the same control signal and/or in response to a separate manual control signal that may drive manual controls to move in a manner simulating operation by a user. Manual controls may be physically moved using any suitable actuators, including without limitation electrical motors such a direct current (DC) brushless motors, servomotors, steppers, or the like, solenoids, pneumatic actuators, and/or hydraulic actuators.

Still referring to FIG. 1, autonomous navigation module 128 may be configured to sense that a user is operating manual controls, and to accept user commands in lieu of commands of autonomous navigation module 128. User direction of manual controls may be detected, without limitation, using a sensor that detects angular or linear displacement, such as a Hall effect, optical, and/or other rotary encoder and/or a linear displacement sensor. In an embodiment, autonomous navigation module 128 may have an autonomous navigation state or mode and a user navigation mode; during autonomous navigation mode, actuators may resist movement by a user of manual controls to a greater extent than in user navigation mode, in which controls may respond in a manner typical of a manually operated boat. In autonomous navigation mode, a user may still be able to move manual controls sufficiently to alert autonomous navigation module 128 that user is attempting to manually override autonomous navigation module 128. Upon detection, autonomous navigation module 128 may switch to user navigation mode. Switch may be for a single action or maneuver, after which autonomous navigation mode may resume; alternatively or additionally, switch may be for a period measured by a timer, where if a further user control activation is not detected during such period, autonomous navigation module 128 may revert to autonomous navigation mode. Alternatively or additionally, a "mushroom button" or other manual switch or control may be communicatively connected to autonomous navigation module 128.

Still referring to FIG. 1, apparatus 100 and/or autonomous navigation module 128 may be configured to stop an autonomous control of boat 112 and/or sonic unit 104 and/or or provide an alert to a user and/or a remote device if a quality of data is below a specified threshold. Apparatus 100 may check the standard of data quality and an overall process by evaluating the rate data is received, whether data is self-consistent, whether data is consistent among a plurality of sensors of ultrasound sensor 108, and/or the like. Apparatus 100 and/or image processing module 120 may be configured to identify, flag and/or autocorrect inconsistencies of data in overlapping areas of the same surveyed area.

With continued reference to FIG. 1, apparatus 110 and/or boat 112 may include safety measures to disengage and/or override autonomous navigation module 128. Boat 112 and/or apparatus 100 may include a safety toggle to kill input power to motors. Boat 112 and/or apparatus 100 may include a mushroom button, which may kill power to throttle clutch and/or shift clutch. Mushroom button may send a disable signal and emergency stop to a controller. Steering motor may be configured so can be overpowered by a human operator. Actuators may be configured to only permit clutches to stay on for a period of time. Boat 112 and/or apparatus 100 may include a watchdog timer that requires a variable on a controller to be flipped at a given rate or the controller will enter a faulted state.

Figure 2:
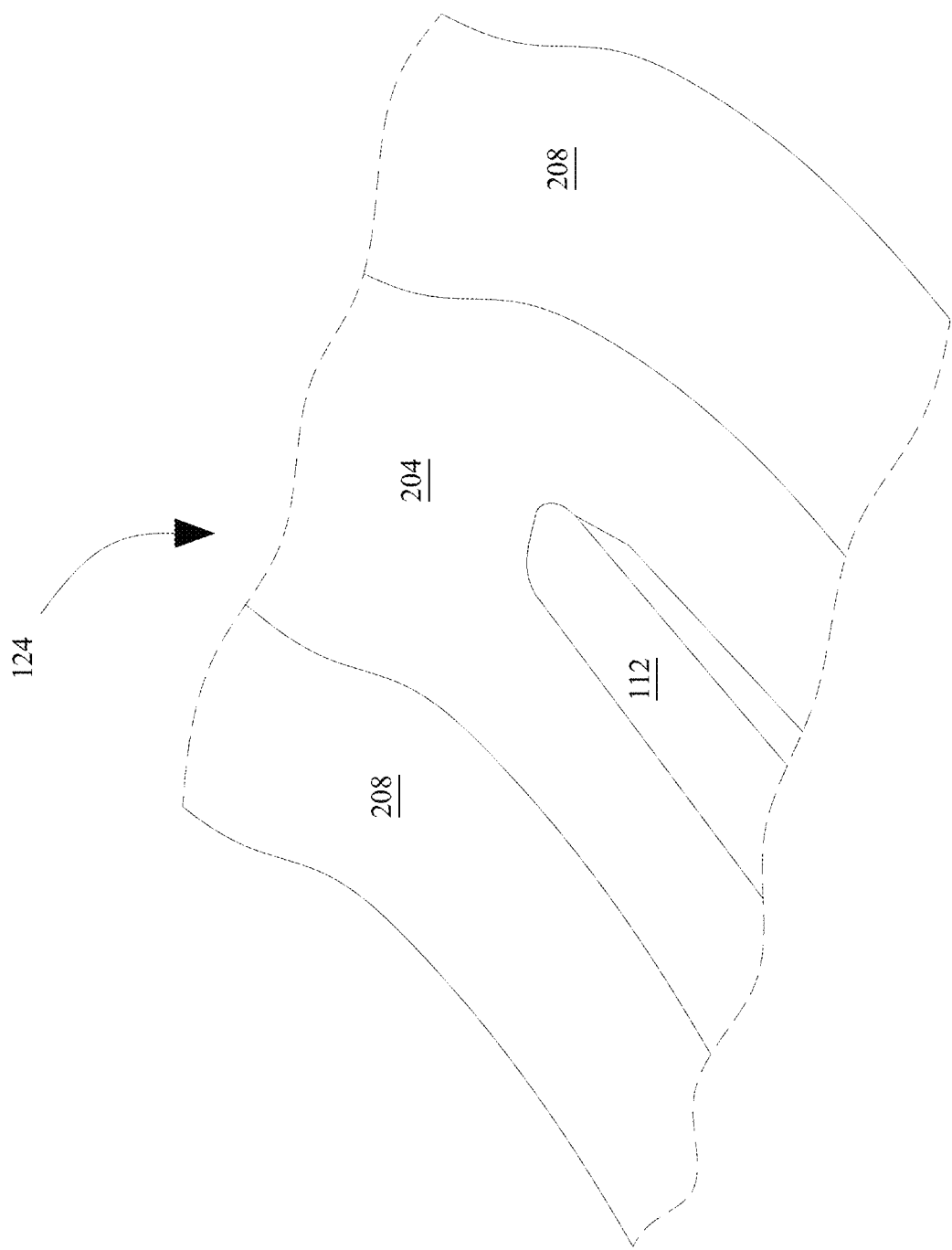
FIG. 2 illustrates an exemplary embodiment of a display according to an embodiment of the present disclosure.

Now referring to FIG. 2, an exemplary embodiment of depicting a boat 112 traversing a channel 204 is illustrated. Channel 204 may include a shipping channel, defined as a waterway traversed by ships and boats. A shipping channel may have depth and/or volume characteristics sufficient to admit ships of a given size and/or displacement; information describing which ships can suitably navigate a shipping channel may be published and/or stored; however, natural changes such as silt accumulation, shifting sandbars, or the like may affect an actual current depth or volume of a shipping channel. In some embodiments, apparatus 100 and/or remoted device 900 may be configured to determine changes to depth, shape, and/or volume of shipping channels. In some embodiments, a buffer 208 for a boat 112 may indicate a distance from channel 204 that may be safely navigated; maintaining buffer 208 around a boat during navigation may ensure successful navigation without running aground. Route 204 and/or buffer 208 may be based on any of the factors discussed in this disclosure, including water depth and/or hull draft of a ship or boat. Channel 204 may identify an ideal pathway for a boat, wherein buffer 208 may identify an area that boat may safely travel through but is not ideal, which may be based on water depth, proximity to shallow water, or the like.

Figure 3:
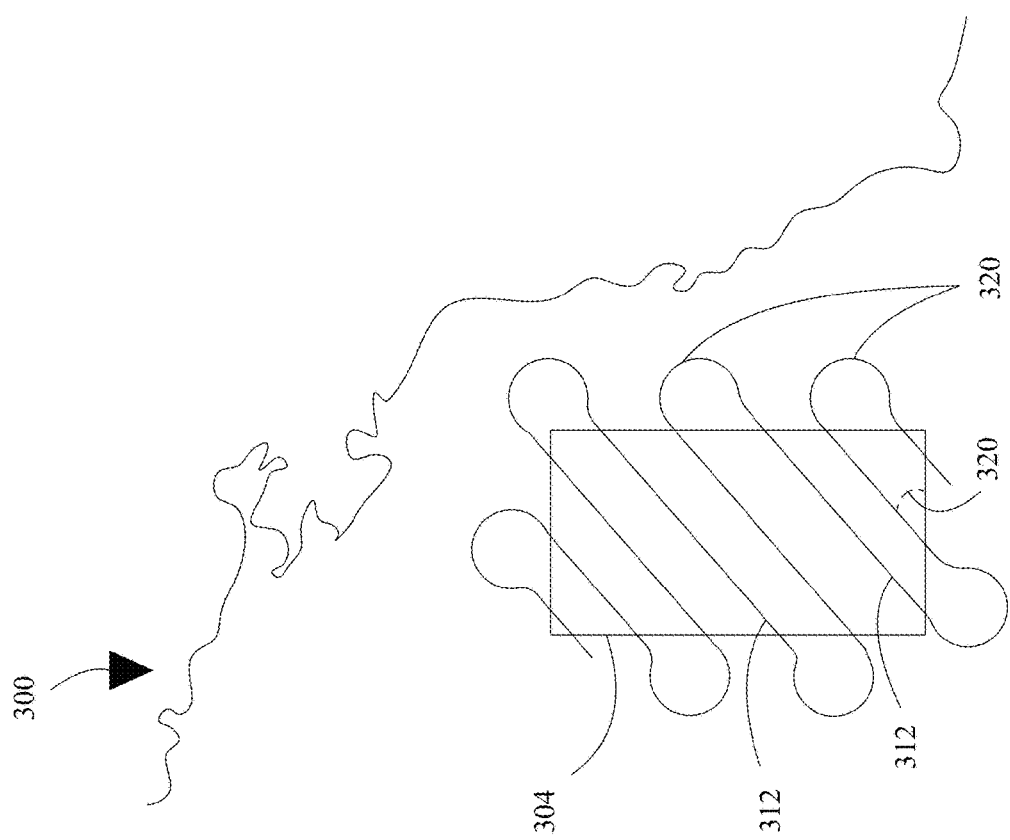
FIG. 3 illustrates an exemplary traversal path according to an embodiment of the present disclosure.

Now referring to FIG. 3, a map 300 is illustrated. Map 300 may include a representation of a bathymetric survey area 304. Area 304 may be defined on map using any suitable shape, which may be defined and/or signaled to apparatus 100 using coordinates of edges, vertices, and/or other geometric indications defining the boundaries of area 304. Map 300 may include a traversal path 308 determined by a remote device and/or autonomous navigation module 128 to conduct a bathymetric survey and/or in which to capture and render bathymetric image. As discussed above, traversal path 308 may include line segments 312, which may be parallel with each other. Line segments 312 may be connected to adjacent line segments 312 by turnarounds 316, which provide a route for boat 112 to turn around once it has passed area 304 to continue the survey. Turnaround 316 may bow out from line segments 312 based on the turning radius of boat 112 and the proximity of adjacent line segments 312.

Figure 4:
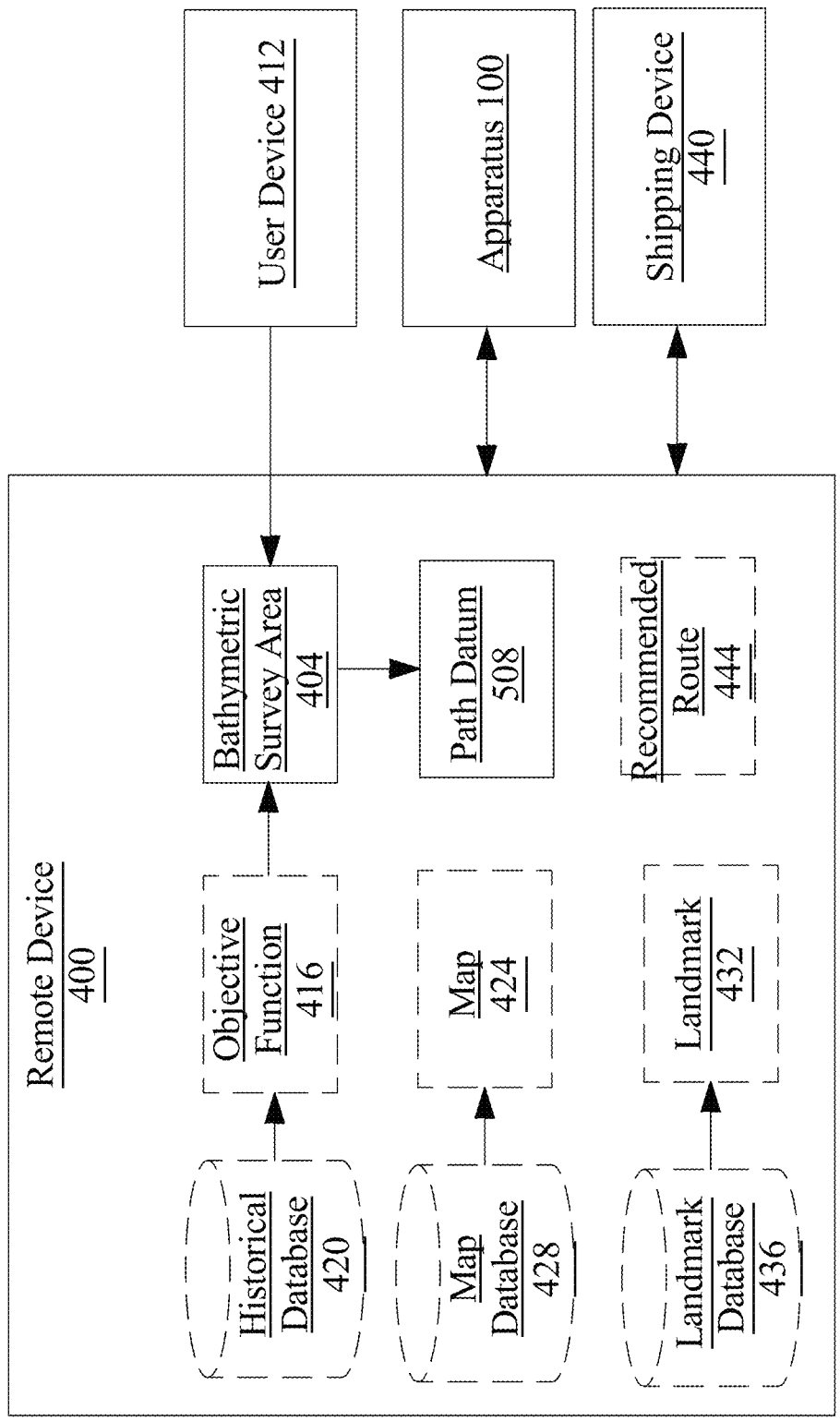
FIG. 4 is a block diagram of a remote device according to an embodiment of the present disclosure.

Now referring to FIG. 4, a remote device 400 is illustrated. Remote device 400 may include an apparatus for remote control and coordination of autonomous bathymetric apparatuses. Remote device 400 may include at least a processor, which may include any processor and/or combination of processors as described in this disclosure. Remote device 400 may include a memory coupled to the at least a processor. Generally, remote device 400 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Remote device 400 may include a single computing device operating independently, or may include two or more computing device operating in concert, in parallel, sequentially or the like; two or more computing devices may be included together in a single computing device or in two or more computing devices. Remote device 400 may interface or communicate with one or more additional devices as described below in further detail via a network interface device. Network interface device may be utilized for connecting remote device 400 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Remote device 400 may include but is not limited to, for example, a computing device or cluster of computing devices in a first location and a second computing device or cluster of computing devices in a second location. Remote device 400 may include one or more computing devices dedicated to data storage, security, distribution of traffic for load balancing, and the like. Remote device 400 may distribute one or more computing tasks as described below across a plurality of computing devices of computing device, which may operate in parallel, in series, redundantly, or in any other manner used for distribution of tasks or memory between computing devices. Remote device 400 may be implemented using a "shared nothing" architecture in which data is cached at the worker, in an embodiment, this may enable scalability of apparatus 100 and/or computing device.

With continued reference to FIG. 4, remote device 400 may be designed and/or configured to perform any method, method step, or sequence of method steps in any embodiment described in this disclosure, in any order and with any degree of repetition. Memory may, for instance, contain instructions configuring at least a processor of remote device 400 to perform any method, method step, or sequence of method steps in any embodiment described in this disclosure, in any order and with any degree of repetition. For instance, remote device 400 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Remote device 400 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 4, remote device 400 may be configured to select and/or identify a bathymetric survey area 404, defined for the purposes of this disclosure as an area to be traversed as described above, for instance and without limitation as depicted in FIG. 3. In some embodiments, selection may be performed as a function of a map 424. An indication of map 424, bathymetric survey area 404, or the like may be entered by a user of remote device 400 and/or another device communicatively connected thereto. A user may enter map 424, bathymetric survey area 404, and/or one or more elements thereof at a user device 412. Entry may include selection of displayed potential bathymetric survey areas 404; for instance, remote device 400 may display one or more potential areas on a map 424 that a user is displaying at user device 412, within a region thereof selected by user, or the like. Alternatively or additionally, remote device 400 may display one or more potential bathymetric survey areas 404 that are selected using one or more selection criteria as described in further detail below.

Continuing to refer to FIG. 4, remote device 400 may select bathymetric survey area 404 and/or a plurality of potential bathymetric survey areas 404 using one or more schedules and/or selection criteria. For instance, each shipping channel or other area of interest may have a frequency at which it should typically be surveyed; this frequency may be based, without limitation, on a degree of presence of natural and/or artificial factors that may tend to modify the depth and/or volume of a shipping channel over time, such as deposit of silt from river deltas and/or estuaries, presence and variability of sandbars, and the like. Frequency of mapping may alternatively or additionally be determined from historical data concerning past changes to shipping channel. Selection of a shipping channel may also depend, without limitation, on notification and/or received data indicative of events tending to alter a channel, such as shipwrecks. Selection may be performed in part based on a recency of a previous survey, where a channel that was most recently surveyed a longer time ago may be selected over a channel that has been surveyed more recently. Selection may be performed at least in part based on a degree of activity in a channel; for instance, a more frequently traveled channel, in terms of tonnage shipped and/or economic value of tonnage, may be selected over a channel that is less frequently traveled. Selection may be performed at least in part based on nearness of apparatus 100 or a member of a fleet including apparatus 100 to a channel.

Still referring to FIG. 4, automatic selection of a channel may be selected according to an optimization problem, for instance by maximizing and/or minimizing an objective function. An "objective function" as used in this disclosure is function that may be maximizing or minimizing based on a set of constraints to select an optimal or near optimal set of parameters. Each of the above-described selection criteria may be used as optimization criteria in objective function Function may be defined by reference to constraints, such as and/or weighted aggregation thereof; for instance, a communication function combining optimization criteria may seek to minimize or maximize a function of constraints affecting ability of apparatuses to traverse shipping lanes in a given time. In some embodiments, a route to be followed by a given boat 112 and/or apparatus may be selected from a graph representing potential routes to be followed. Routes may be weighted according to factors described above, and an algorithm may be applied to find a locally optimal weighted traveling salesman problem or similar. Algorithm may include, without limitation, a greedy algorithm. A "greedy algorithm" is defined as an algorithm that selects locally optimal choices, which may or may not generate a globally optimal solution. For instance, when a given boat 112 is at a first shipping channel, a subsequent shipping channel that maximizes and/or optimizes objective function 416 may be selected, regardless of potential longer series of selections that may be globally optimal.

Still referring to FIG. 2, an objective function 416 may be formulated as a linear objective function. First node 204 may solve objective function 416 using a linear program such as without limitation a mixed-integer program. A "linear program," as used in this disclosure, is a program that optimizes a linear objective function, given at least a constraint. In some embodiments, an objective function 416 may be formulated as a mixed integer optimization function. A "mixed integer optimization" as used in this disclosure is a program in which some or all of the variables are restricted to be integers. A mathematical solver may be implemented to solve for the set of feasible path selections.

With continuing reference to FIG. 4, remote device 400 may be configured to generate a path datum 408 as a function of the bathymetric survey area 404. Path datum 408 may include any path datum 408 described above. Generating the path datum 408 may include determining a survey resolution, defined as an amount of spacing between traversal paths to be followed across bathymetric survey area 404. Determination of survey resolution may be performed at remote device 400 and/or at apparatus. Survey resolution may be selected based on factors including, without limitation, signal to noise ratio in bathymetric data and/or images received from apparatus 100 and/or as determined and communicated by apparatus 100, average and/or minimum depth of an area to be traversed by a swath as estimated from current bathymetric data and/or calculated from past bathymetric data, and/or error rates in currently captured data. Selection may be performed, without limitation, by looking up spacing in a lookup table using any or all of the above criteria as a query. Alternatively or additionally, a machine-learning model may be trained using training data that correlates criteria to past selections for survey resolution associated with successful surveys; criteria may be entered to machine-learning model, and survey resolution may be output thereby. Alternatively or additionally, survey resolution may be entered and/or selected by a user. Survey resolution may be calculated per survey area, per a sub-area of survey, and/or per traversal and/or swath. Survey resolution may be actively adjusted in response to further data concerning local depth, error rate, signal to noise ratio, or the like.

Still referring to FIG. 4, which may be recorded in a historical database 420, which may be configured to store information describing each past bathymetric survey, bathymetric images previously rendered, and/or data from one or more third parties describing depth, volume, shape, and/or other parameters previously recorded and/or estimated for a given area. Historical database 420 may be implemented, without limitation, as a relational database, a key-value retrieval database such as a NOSQL database, or any other format or structure for use as a database that a person skilled in the art would recognize as suitable upon review of the entirety of this disclosure. Historical database 420 may alternatively or additionally be implemented using a distributed data storage protocol and/or data structure, such as a distributed hash table or the like. Historical database 420 may include a plurality of data entries and/or records as described above. Data entries in a historical database 420 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Further referring to FIG. 4, determination of path datum 408 may include determining a traversal direction, which may include an angle relative to bathymetric survey area 404 that traversal paths will follow. Determination of path datum 408 may include determining a traversal path. A user may enter a desired traversal direction at user device 412; alternatively, remote device 400 may retrieve a stored set of traversal directions and/or traversal directions already used in a recent survey at area, and select a current traversal direction from the stored set. Remote device 400 may transmit instructions to apparatus 100 to make such changes to traversal paths, or any other mitigation changes described herein. Initial choices of traversal paths and/or modifications thereto, including choices and/or modifications of directions of travel, spacing between paths, points of entry and/or initiation may be performed by selecting default values, such as a default angle of traversal relative to a direction of travel in a shipping lane, which absent a user input may be an initial choice of heading. Subsequent passes over an area may similarly have default angles defined according to an angle of difference from a previous angle of traversal; alternatively or additionally, a machine-learning model and/or neural network may be trained using past surveys of various bathymetric features to select a second angle of traversal that will maximize additional information gained over the previous angle or angles of traversal in previous pass or passes. For instance, and without limitation, a neural network may be provided as a training example with images of a given region and/or bathymetric feature taken from various traversal angles; additional examples of additional features may be used. A neural network may then be trained to select a likely optimal second angle of traversal given an image captured in a first angle of traversal. Selections may be made, automatically and/or with user input, to backfill, cover areas of floor that were missed in previous passes, or the like. Any or all processes for traversal angle selection, path selection, or the like may be used to determine and/or select survey lines based on existing chart data, based on previously selected and/or used survey lines, and/or a nearby shoreline, any of which may be used as inputs to processes described above.

Still referring to FIG. 1, selection and/or generation of survey lines, traversal directions, and/or path information may be performed based on gaps in previous surveys and/or survey passes. For instance, and without limitation, when any processes and/or process steps as described in this disclosure have been used to generate a bathymetric image, apparatus and/or a remote device may be configured to detect one or more gaps, "holidays," and/or other missed spots on an ocean, lake, estuary, river or other floor. Detection may be performed, without limitation, by user entry identifying such gaps, by determination that a given area is lacking in features, for instance by using an FFT or other measure of variation over areas and determining that variation over the area is below a threshold level, and/or using a neural network or other machine-learning model trained to identify gaps using training examples correlating portions of bathymetric images with identifications of gaps. Apparatus and/or remote device may generate one or more paths for apparatus to traverse in order to capture bathymetric data corresponding to gaps, for instance to fill the gaps in.

Still referring to FIG. 4, remote device 400 may be configured to transmit to an apparatus 100 for automated bathymetry, path datum 408. Transmission may be effected using any communication devices and/or facilities suitable for use by communication module 132. Remote device 400 may be configured, without limitation, to transmit any path datum 408 as described above; apparatus 100 may derive one or more path data as described above from transmitted path datum 408, using any process of such derivation as described in this disclosure.

Continuing to refer to FIG. 4, remote device 400 may be configured to transmit a map 424 associated with bathymetric survey area 404, including any map 424 as described and/or device above to apparatus 100. Map 424 may be selected, without limitation, based on selected bathymetric survey area 404. For instance, and without limitation, map 424 may be retrieved from a map database 428, which may be implemented in any manner suitable for implementation of historical database 420. Retrieval from map database 428 may include querying map database 428 with coordinates or other descriptors of bathymetric survey area 404.

With further reference to FIG. 4, remote device 400 may be configured to transmit an image of an underwater landmark 432 associated with bathymetric survey area 404 to apparatus 100. Underwater landmark 432 may be selected, without limitation, based on selected bathymetric survey area 404. For instance, and without limitation, map 424 may be retrieved from a landmark database 436, which may be implemented in any manner suitable for implementation of historical database 420. Retrieval from landmark database 436 may include querying landmark database 436 with coordinates or other descriptors of bathymetric survey area 404. In an embodiment, multiple landmarks 432 may be retrieved from landmark database 436 and/or transmitted to apparatus 100.

Still referring to FIG. 4, remote device 400 may be configured to receive a bathymetric image from apparatus 100. Remote device 400 may register a received bathymetric image, or a bathymetric image derived and/or generated using further processes as described below, to a map 424; this may be implemented in any manner suitable for registration of a bathymetric image as described above. For instance, and without limitation, remote device 400 may classifying a feature in bathymetric image to an underwater landmark 432, which may be performed without limitation as described above. Remote device 400 may receive bathymetric image in an assembled or complete form; alternatively or additionally, remote device 400 may receive a swath of bathymetric image from apparatus 100 at a time. Remote device 400 may receive bathymetric images from multiple apparatuses and/or as a result of multiple surveys performed by a single apparatus 100.

Continuing to refer to FIG. 4. Remote device 400 may be configured to combine one or more elements together to produce a unified bathymetric image. For instance, and without limitation, bathymetric image may include a plurality of swaths, such as a plurality of swaths captured in traversals or passes by apparatus 100. Remote device 400 may be configured to combine swaths to form a unified bathymetric image. Remote device 400 may receive a plurality of bathymetric images, and generate a combined image as a function of the plurality of bathymetric images. Combination of swaths and/or images may be accomplished, without limitation, as described below.

Still referring to FIG. 4, remote device 400 may perform one or more steps of error correction and/or calibration, including without limitation any error correction and/or calibration that apparatus and/or image processing device 120 may perform as described above. For instance, where remote device 400 combines multiple swaths to form combined bathymetric image, swaths may have overlapping regions. Remote device 400 may identify differences between overlapping regions and/or produce a portion of swath where overlap occurs in which information from two overlapping versions of region is combined to eliminate error in one or the other region. Overlap may alternatively or additionally be between two surveys of bathymetric survey area 404 captured by two apparatuses and/or by the same apparatus traversing the area twice. Combination and/or error correction of two overlapping images may be accomplished, without limitation, using a machine learning model, which may include, without limitation a neural network as described in this disclosure. Machine-learning model may be trained, without limitation, using training examples correlating overlapping swaths and/or images with correctly combined swaths and/or images. For instance, and without limitation, training examples of various overlapping bathymetric swaths may be combined with reconciled versions represented by repeated capture of bathymetric swaths at overlapping region, for instance as taken by a large number of repeated passes and a reconciliation process to minimize differences between captured images, and/or as augmented using varied imaging techniques such as LIDAR or the like. Such training examples may be used to train a neural network or other machine-learning model to produce a reconciled final image given two overlapping images of a bathymetric swath and/or region. Similarly, bathymetric images taken by different passes using different traversal angles may be reconciled by such a neural network and/or machine-learning process. Alternatively or additionally, one or more statistical methods may be used to determine coverage and/or to identify likely bathymetric measurements and/or values based on overlapping swaths; such statistical methods may be implemented by training and utilizing regression or other machine-learning models.

Still referring to FIG. 4, as noted above, remote device 400 may perform patch-testing, calibration routines at one or more levels, distortion correction around thermoclines, or the like. Alternatively, remote device 400 may use artificial intelligence, such as classifiers to learn to identification signatures of particular distortions based on salinity, temperature, and/or pressure, for instance and without limitation as described above.

Continuing to refer to FIG. 4, remote device 400 may determine at least a shipping channel datum as a function of bathymetric image, including an average depth, a minimum depth, and/or a depth chart. As used in this disclosure, a "shipping channel datum" is an element of data encoding one or more metrics of a shipping channel. Remote device 400 may determine a change is shipping channel datum, such as a change from a first shipping channel datum to a second shipping channel datum. A change in shipping channel datum may be based on a variety of factors, such as sedimentation, seismic activity, volcanic activity, oil spills, shipwrecks, and/or the like. Remote device 400 may be configured to calculate a rate of change of shipping channel datum.

Still referring to FIG. 4, remote device 400 may be configured to predict a future change of shipping channel datum as a function of bathymetric image. Remote device 400 may be configured to predict changes to channels based on previous changes to channels and correlating factors such as time lapsed, weather conditions, seasons, and the like. Remote device 400 may base predictions on data it has gathered from surveys and/or information collected from external sources. Similarly, ultrasound may predict effects on shipping routes from weather forecasts and weather predictions. Remote device 400 may alter shipping routes based on a ship's hull draft, changes to channels, and/or predictions to changes to channels. Remote device 400 may perform optimization of cost drivers based on channel shape to optimize time, fuel, etc. Remote device 400 may perform great circle routing (or best approximation thereto), and calculations for riding the tides (vessels getting deeper, but channels may not allow except at high tide)—tools to improve. Remote device 400 may assess and/or minimize environmental impact such as impact on mooring anchorages, seafloor ecosystems, fuel consumption and emissions. For example, a better prediction of fuel needed for a voyage based on a better-defined route may reduce the amount of fuel reserves needed. Remote device 400 may generate a route within a channel with sufficient depth so a boat 112 may reduce travel time and fuel needed, may improve circle routing, and may provide opportunities for boats 112 to ride tides in areas where channels are otherwise too shallow.

Continuing to refer to FIG. 4, prediction of changes to shipping channels may be performed without limitation, by using a machine-learning process discussed in this disclosure. Training data may include inputs from various types of databases, resources, and/or user inputs and outputs correlated to each of those inputs so that a machine-learning module may determine an output, such as a predicted change in shipping channel datum, from an input, such as bathymetric data and corresponding changes in shipping channel datum. Training data may be obtained from and/or in the form of previous sets of bathymetric data and changes to shipping channel datum. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements.

With continued reference to FIG. 4, remote device 400 may receive route data from a shipping device 440, such as a device associated with a boat, shipping company, and/or port authority. As used in this disclosure, "route data" is data encoding one or more elements of a shipping route such as one or more departure and/or destination ports. Remote device 400 may be configured to determine if route data agrees with bathymetric data. For example, remote device 400 may determine whether route data describes a shipping route that is safe, efficient, and/or the like based on bathymetric data. Remote device 400 may be configured to generate a recommended route 444 using bathymetric data, including great-circle paths through and/or between channels; recommended route 444 may be transmitted to shipping device. Remote device 400 may also generate alternate shipping routes, such as a first-choice route, a second-choice route, and the like in case the primary shipping route is not possible, impractical, overused, or the like. Remote device 400 may generate shipping route based on weather forecasting data. As used in this disclosure, "weather forecasting data" is data encoding one or more metrics of forecasted weather conditions. For example, if a primary shipping route is near or within an area of adverse weather conditions such as a predicted storm, remote device 400 may generate a shipping route that avoids the storm. Remote device 400 may iteratively generate an updated shipping route based on new weather forecasting data and/or other pertinent information such as port and/or channel closures or high traffic.

Still referring to FIG. 4, remote device 400 may predict effects on shipping routes from weather forecasts and weather predictions. Remote device 400 may alter shipping routes based on a ship's hull draft, changes to channels, and/or predictions to changes to channels. Remote device 400 may perform optimization of cost drivers based on channel shape to optimize time, fuel, etc. Remote device 400 may perform great circle routing (or best approximation thereto), and calculations for riding the tides (vessels getting deeper, but channels may not allow except at high tide)—tools to improve. Remote device 400 may assess and/or minimize environmental impact such as impact on mooring anchorages, seafloor ecosystems, fuel consumption and emissions. For example, a better prediction of fuel needed for a voyage based on a better-defined route may reduce the amount of fuel reserves needed. Remote device 400 may generate a route within a channel with sufficient depth so a boat 112 may reduce travel time and fuel needed, may improve circle routing, and may provide opportunities for boats 112 to ride tides in areas where channels are otherwise too shallow.

Still referring to FIG. 4, remote device 400 may select a route to optimize any or all selection criteria; for instance and without limitation, an objective function 416 of the above-described criteria may be optimized using any process as described above, and/or used to weight legs of a graph representing traversal of shipping routes connected by great circle arcs. Optimization may include greedy optimization, linear optimization, or the like.

Figure 5:
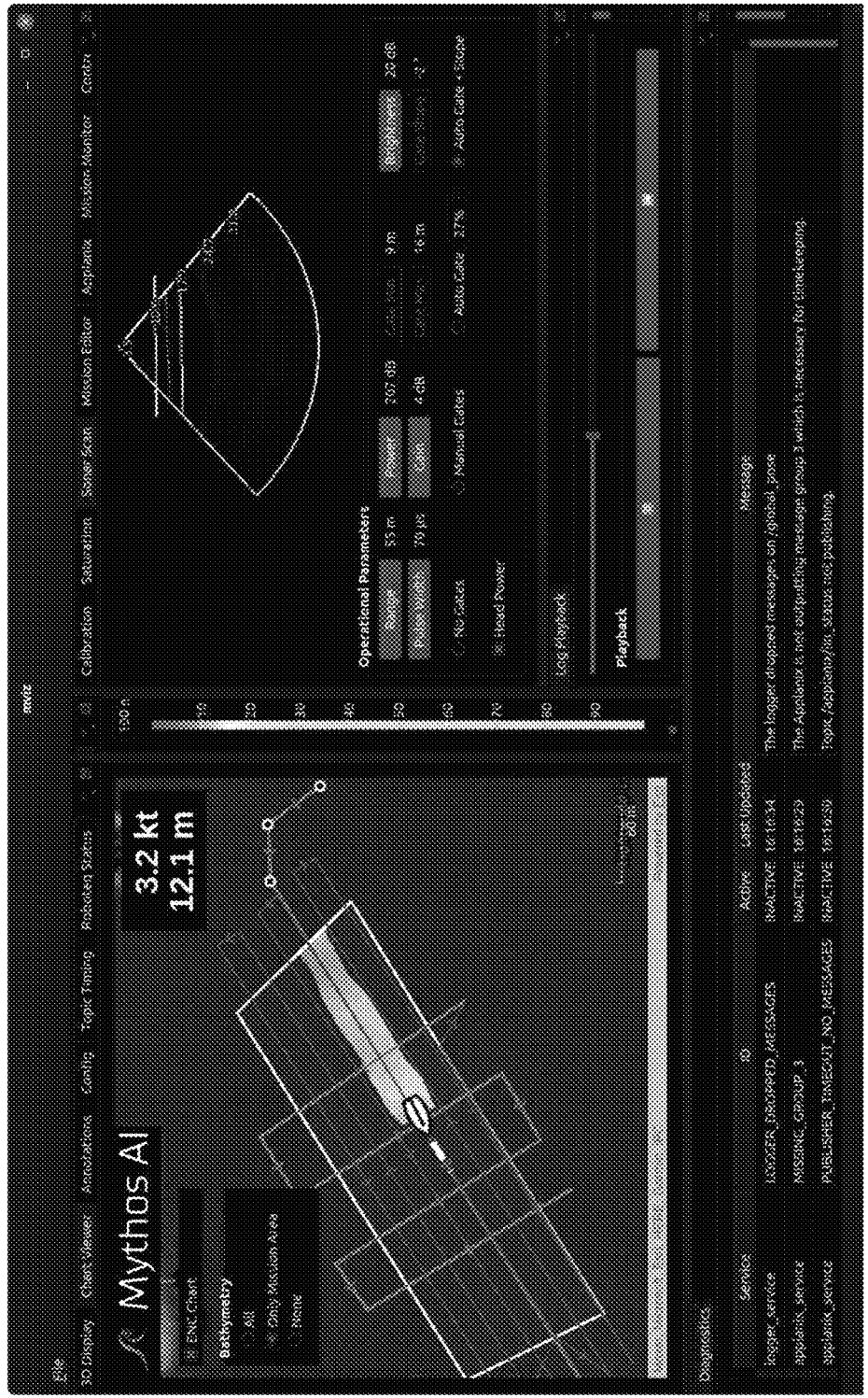
FIG. 5 is a screen shot of display of data and mapping according to an embodiment of the present disclosure.

Now referring to FIG. 5, an exemplary screenshot 500 illustrating exemplary embodiments of graphical user interface (GUI) windows is provided. GUI windows may include, without limitation, a parameter entry window. Parameter entry window may permit a user to input one or more parameters of a bathymetric survey, such as without limitation survey resolution, traversal direction, bathymetric survey area, range, pulse width, power (for instance in decibels), gain, gate minimum and/or maximum, brightness, gated slope, or the like. GUI windows may include, without limitation, one or more bathymetric view windows, which may permit a user to view one or more views of a bathymetric image; user may be able to rotate image through three dimensions, zoom in or out of image, or the like. GUI windows may include, without limitation, a map window, which may permit a user to view a map of a region containing bathymetric survey area and/or potential bathymetric survey areas; user may be able to view bathymetric survey area and/or traversal paths and/or turnarounds imposed on map. GUI windows may include a metric data window, which may display one or more elements of data gathered and/or rendered by sonic device 104. GUI windows may include one or more path data windows, which may illustrate a path to be traversed by apparatus 100 and/or boat. Paths may show directions of travel, turnaround locations, size, and/or radii, or the like. Path data window may illustrate portions of a path along which a boat and/or device 100 has completed a survey, for instance and without limitation using a highlighted color to show the already surveyed portion, and/or by superimposing bathymetric data on that portion of a map.

Figure 6:
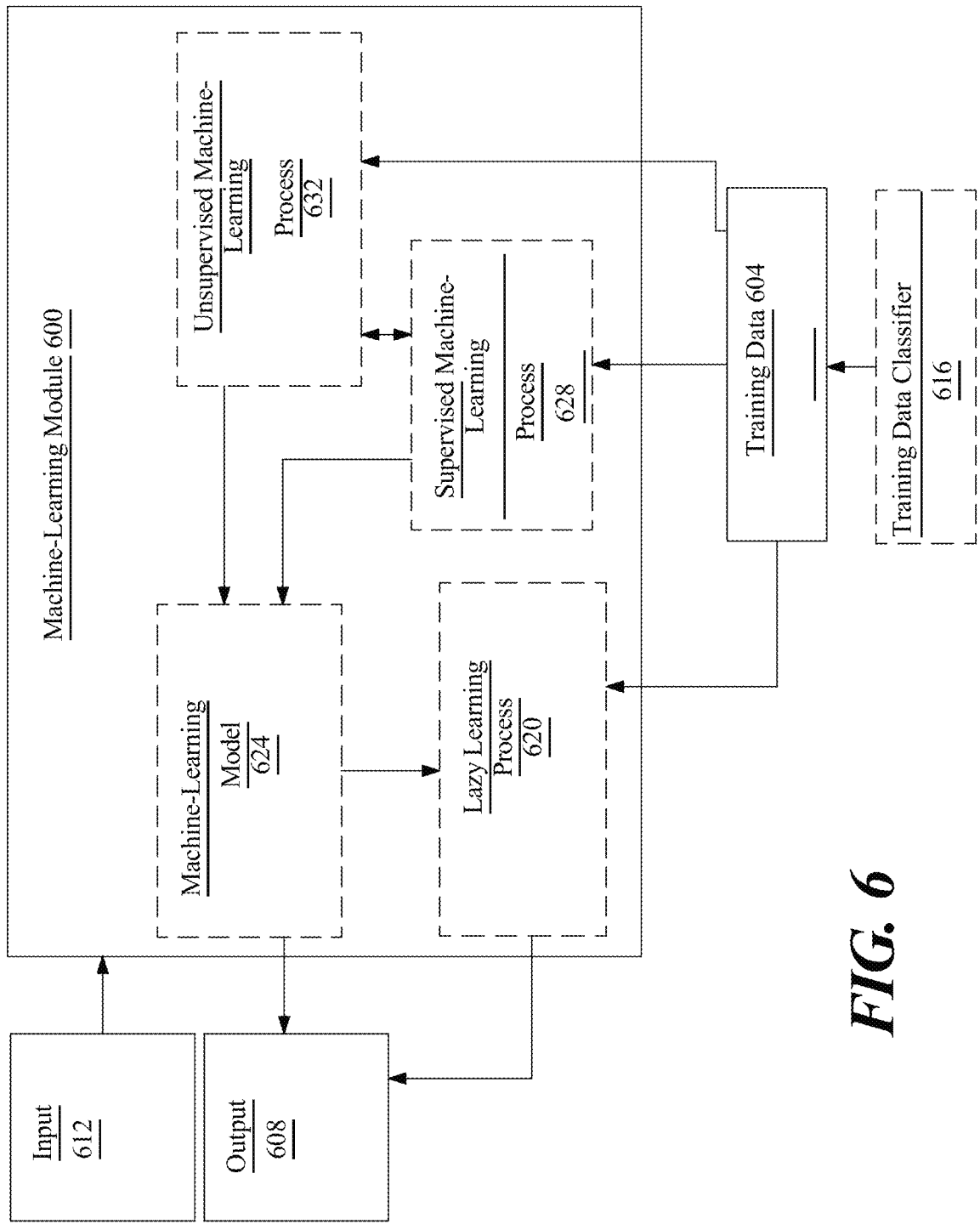
FIG. 6 is a block diagram of exemplary machine-learning processes.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 7:
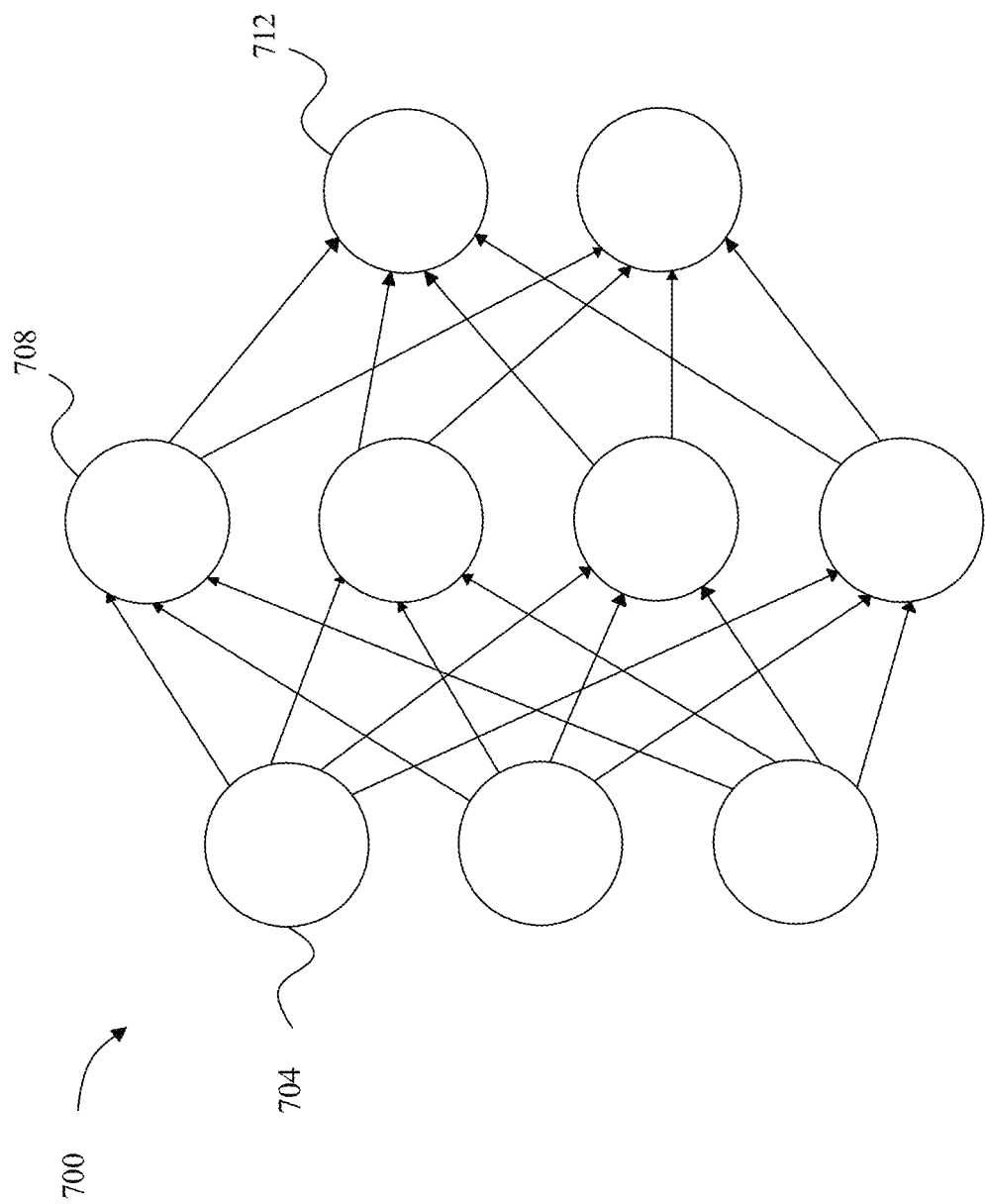
FIG. 7 is a block diagram of an exemplary neural network.

Referring now to FIG. 7, an exemplary embodiment of neural network 700 is illustrated. A neural network 700 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 704, one or more intermediate layers 708, and an output layer of nodes 712. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 8:
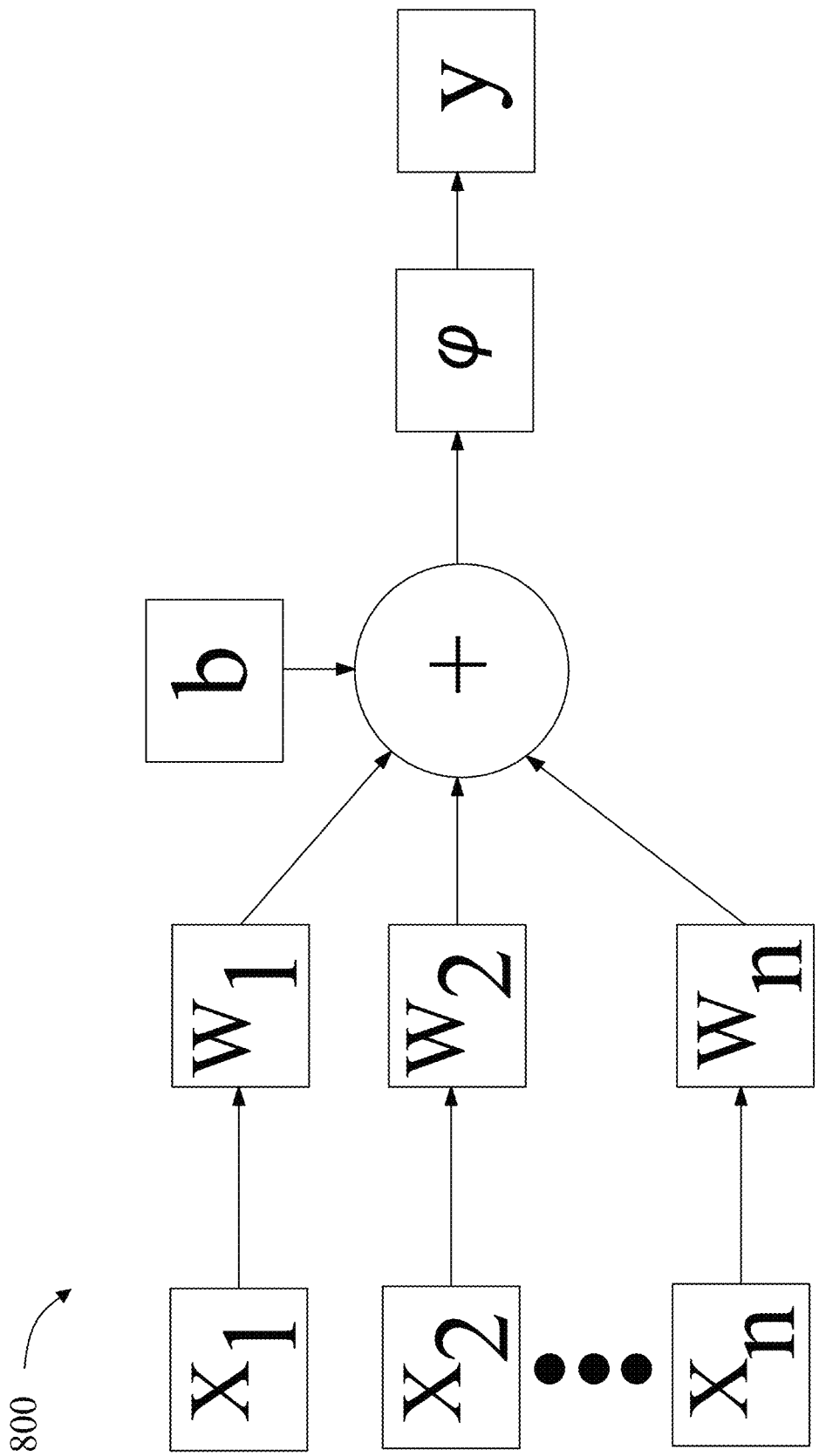
FIG. 8 is a block diagram of an exemplary node.

Referring now to FIG. 8, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 9:
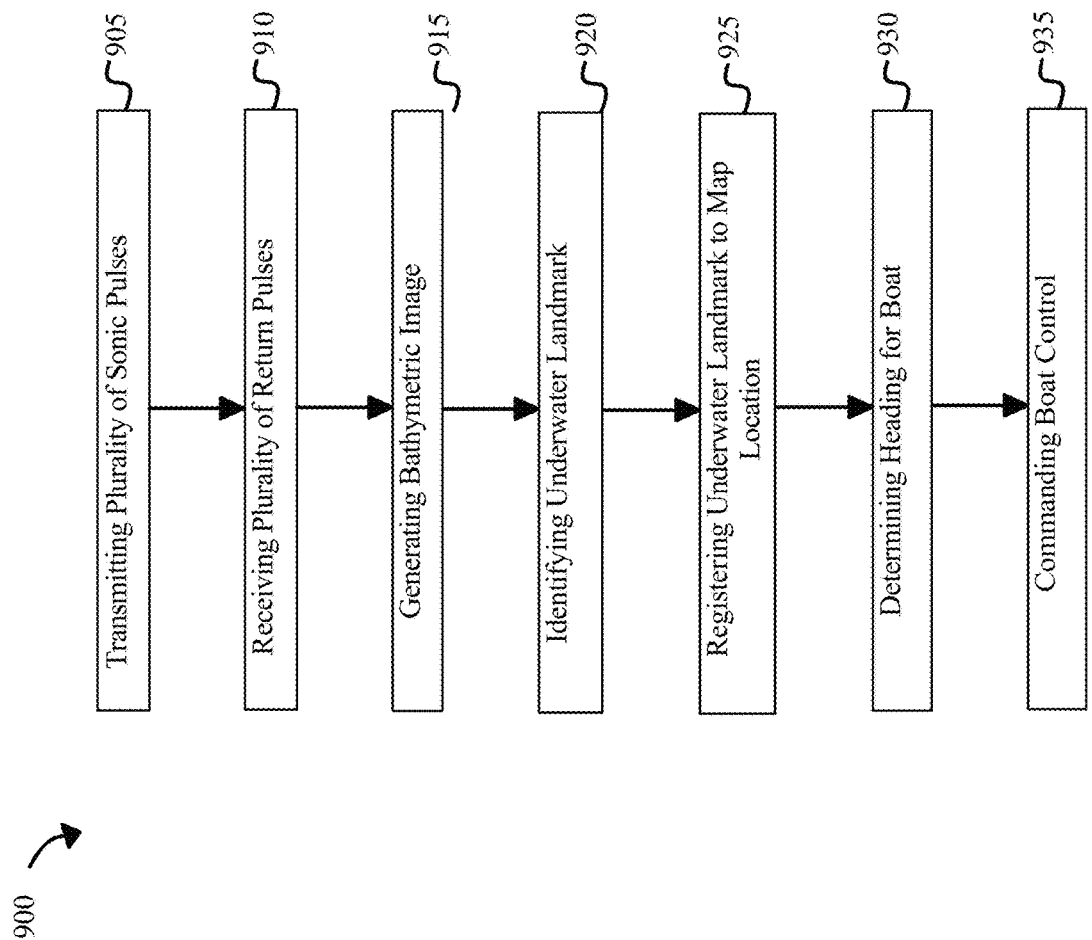
FIG. 9 is a flow diagram of an exemplary method for artificial intelligence bathymetry.

Now referring to FIG. 9, an exemplary embodiment of a method 900 for AI bathymetry is illustrated. At step 905, a sonic unit transmits a plurality of ultrasonic pulses; this may be implemented, without limitation, as described above in reference to FIGS. 1-8.

At step 910, the sonic unit receives a plurality of return pulses; this may be implemented, without limitation, as described above in reference to FIGS. 1-8. Sonic unit may include an autonomous navigation module, wherein the autonomous navigation module may be configured to actuate manual controls installed in a boat based on a setting of a boat control 136. Sonic unit may include an autonomous navigation module, wherein the autonomous navigation module may be configured to coordinate with a fleet of boats a performance of a survey mission.

At step 915, an image processing module generates a bathymetric image as a function of the plurality of time-of-flight data; this may be implemented, without limitation, as described above in reference to FIGS. 1-8. Sonic unit may be configured to identify inconsistencies of data in a surveyed area configured to identify inconsistencies of data in a surveyed area. Image processing module may be communicatively connected to a display, wherein display represents a soundwave datum visually. Sonic unit may be configured to alert a user if a quality of data is below a threshold. Apparatus may be configured to detect at least a hydrological condition and calibrate at least one of image processing module and sonic unit as a function of detected at least a hydrological condition.

At step 920, an image processing module identifies as a function of the bathymetric image, an underwater landmark; this may be implemented, without limitation, as described above in reference to FIGS. 1-8. Landmark identification may be performed by comparing a landmark to at least a stored image.

At step 925, the image processing module registers the bathymetric image to a map location as a function of the underwater landmark; this may be implemented, without limitation, as described above in reference to FIGS. 1-8.

At step 930, an autonomous navigation module determines a heading for the boat as a function of a path datum; this may be implemented, without limitation, as described above in reference to FIGS. 1-8.

At step 935, the autonomous navigation module commands at least a boat control 136 to navigate the boat as a function of the heading, wherein the at least a boat control 136 is communicatively connected to the autonomous navigation module; this may be implemented, without limitation, as described above in reference to FIGS. 1-8. Autonomous navigation module may be configured to actuate manual controls installed in the boat based on the command of at least a boat control 136. Autonomous navigation module may be configured to receive an area to survey. Autonomous navigation module may generate path datum based on received area. Path datum may comprise a traversal path with a traversal angle. Autonomous navigation module may be configured to determine traversal path as a function of viewing conditions. Autonomous navigation module may be configured to coordinate with a fleet of boats a performance of a survey mission.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
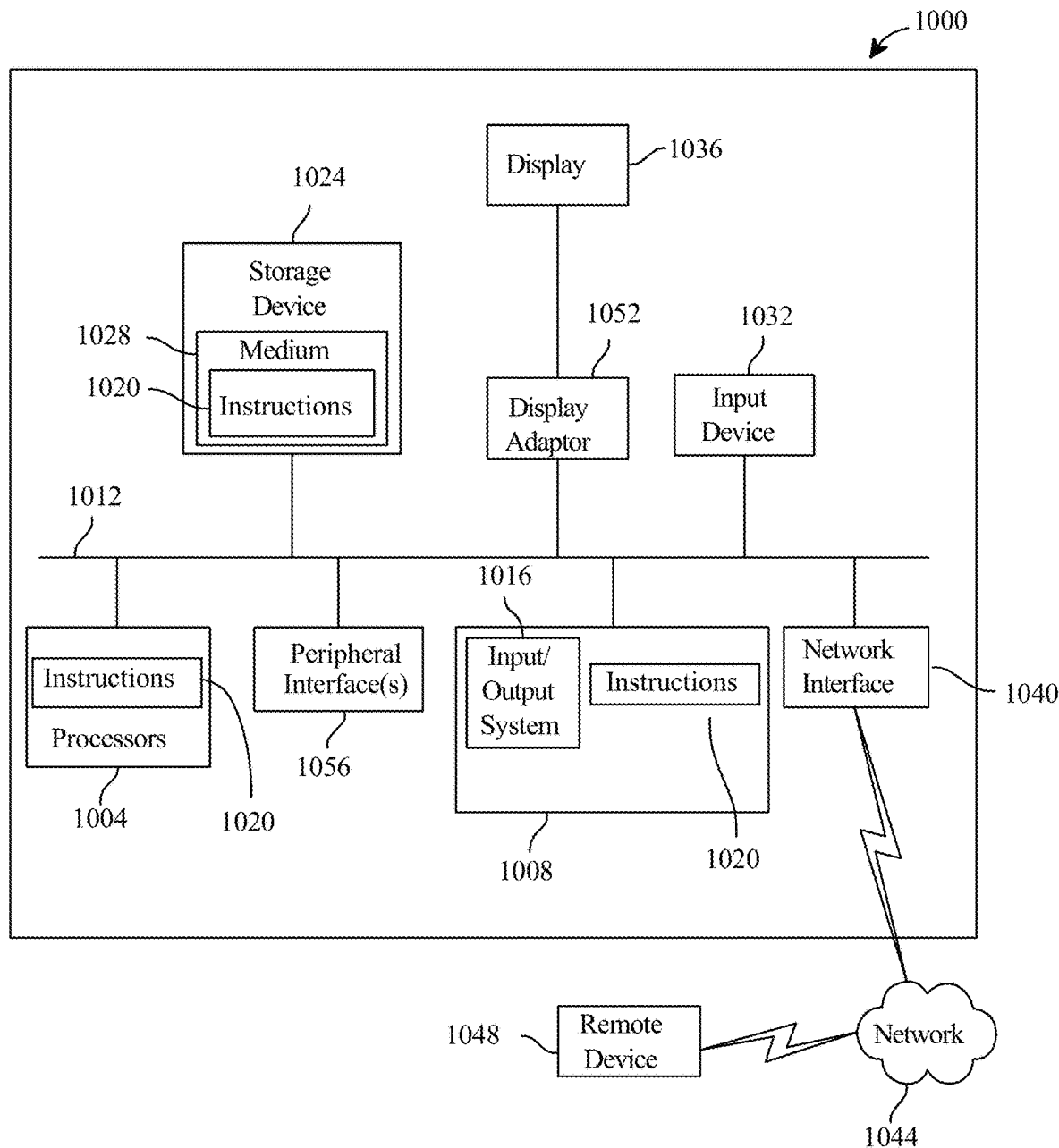
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatus, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for artificial intelligence (AI) bathymetry, the apparatus comprising:
a sonic unit attached to a boat, the sonic unit configured to:
transmit a plurality of ultrasonic pulses;
receive a plurality of return pulses; and
generate a plurality of metric data as a function of the plurality of ultrasonic pulses and the plurality of return pulses;
an image processing module communicatively connected to the sonic unit, the image processing module configured to:
generate a bathymetric image as a function of the plurality of metric data;
identify, as a function of the bathymetric image, an underwater landmark, wherein identifying the underwater landmark further comprises:
retrieving a stored image of the underwater landmark;
comparing the bathymetric image to the stored image; and
identifying the underwater landmark in the bathymetric image as a function of the comparison; and
register the bathymetric image to a map location as a function of the underwater landmark;
a communication module configured to transmit the registered bathymetric image to at least a remote device; and
an autonomous navigation module installed on the boat, the navigation module communicatively connected to at least a boat control, the autonomous navigation module configured to:
determine a heading for the boat as a function of a path datum, wherein the path datum is generated as a function of the registered bathymetric image; and
command the at least a boat control to navigate the boat as a function of the heading.

2. The apparatus of claim 1, wherein comparing the bathymetric image to the stored image further comprises comparing the bathymetric image to the stored image using an image classifier.

3. The apparatus of claim 1, wherein the apparatus is configured to:
detect at least a hydrological condition; and
calibrate at least one of the image processing module and the sonic unit as a function of the detected at least a hydrological condition.

4. The apparatus of claim 1, wherein the autonomous navigation module is configured to actuate manual controls installed in the boat based on the command of the at least a boat control.

5. The apparatus of claim 1, wherein the autonomous navigation module is configured to receive an area to survey.

6. The apparatus of claim 5, wherein the autonomous navigation module generates the path datum based on the received area.

7. The apparatus of claim 5, wherein the path datum comprises a traversal path with a traversal angle.

8. The apparatus of claim 7, wherein autonomous navigation module is configured to:
determine a degree of error associated with generation of the bathymetric image; and
determine the traversal path as a function of the degree of error.

9. The apparatus of claim 1, wherein the autonomous navigation module is configured to coordinate with a fleet of boats a performance of a survey mission.

10. The apparatus of claim 1, wherein the sonic unit is configured to alert a user if a quality of data is below a threshold.

11. A method for artificial intelligence (AI) bathymetry, the method comprising:
transmitting, at a sonic unit attached to a boat, a plurality of ultrasonic pulses;
receiving, at the sonic unit, a plurality of return pulses;
generating, at the sonic unit, a plurality of metric data as a function of the plurality of ultrasonic pulses and the plurality of return pulses;
generating, at an image processing module, a bathymetric image as a function of the plurality of metric data;
identifying, at the image processing module, as a function of the bathymetric image, an underwater landmark as a function of the bathymetric image, an underwater landmark, wherein identifying the underwater landmark further comprises:
retrieving a stored image of the underwater landmark;
comparing the bathymetric image to the stored image; and
identifying the underwater landmark in the bathymetric image as a function of the comparison;
registering, at the image processing module, the bathymetric image to a map location as a function of the underwater landmark;
determining, at an autonomous navigation module, a heading for the boat as a function of a path datum, wherein the path datum is generated as a function of the registered bathymetric image; and
commanding, at the autonomous navigation module, at least a boat control to navigate the boat as a function of the heading, wherein the at least a boat control is communicatively connected to the autonomous navigation module.

12. The method of claim 11, wherein comparing the bathymetric image to the stored image further comprises comparing the bathymetric image to the stored image using an image classifier.

13. The method of claim 11, wherein the apparatus is configured to:

detect at least a hydrological condition; and calibrate at least one of the image processing module and the sonic unit as a function of the detected at least a hydrological condition.

14. The method of claim 11, wherein the autonomous navigation module is configured to actuate manual controls installed in the boat based on the command of the at least a boat control.

15. The method of claim 11, wherein the autonomous navigation module is configured to receive an area to survey.

16. The method of claim 15, wherein the autonomous navigation module generates the path datum based on the received area.

17. The method of claim 15, wherein the path datum comprises a traversal path with a traversal angle.

18. The method of claim 17, wherein autonomous navigation module is configured to:

determine a degree of error associated with generation of the bathymetric image; and determine the traversal path as a function of the degree of error.

19. The method of claim 11, wherein the autonomous navigation module is configured to coordinate with a fleet of boats a performance of a survey mission.

20. The method of claim 11, wherein the sonic unit is configured to alert a user if a quality of data is below a threshold.

* * * * *